(12) United States Patent
Silverman et al.

(10) Patent No.: US 7,744,970 B2
(45) Date of Patent: *Jun. 29, 2010

(54) MULTILAYER LAMINATES COMPRISING TWISTED NEMATIC LIQUID CRYSTALS

(75) Inventors: Lee A. Silverman, Newark, DE (US); Marc B. Goldfinger, West Chester, PA (US); Richard A. Hayes, Brentwood, TN (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 530 days.

This patent is subject to a terminal disclaimer.

(21) Appl. No.: 11/441,899

(22) Filed: May 26, 2006

(65) Prior Publication Data

US 2007/0154718 A1    Jul. 5, 2007

Related U.S. Application Data

(60) Provisional application No. 60/754,978, filed on Dec. 29, 2005, provisional application No. 60/754,904, filed on Dec. 29, 2005, provisional application No. 60/658,719, filed on May 27, 2005, provisional application No. 60/658,292, filed on May 26, 2005, provisional application No. 60/754,678, filed on Dec. 29, 2005.

(51) Int. Cl.
*B32B 7/00* (2006.01)
*B32B 17/06* (2006.01)
*B32B 23/04* (2006.01)
*B32B 27/08* (2006.01)
*B32B 27/20* (2006.01)
*B32B 27/30* (2006.01)
*B32B 27/32* (2006.01)
*B32B 27/36* (2006.01)
*B32B 27/38* (2006.01)

(52) U.S. Cl. .................. 428/1.3; 428/1.1; 428/1.31; 428/1.32; 428/1.33; 428/1.5; 428/1.52; 428/1.53; 428/1.55; 428/1.6; 428/1.62; 428/212; 428/412; 428/413; 428/414; 428/415; 428/417; 428/426; 428/429; 428/430; 428/438; 428/439; 428/441; 428/442; 428/447; 428/449; 428/451; 428/480; 428/483; 428/500; 428/515; 428/522; 428/523; 359/350; 252/299.01; 252/582; 252/587; 349/1; 349/16

(58) Field of Classification Search .................. None
See application file for complete search history.

(56) References Cited

U.S. PATENT DOCUMENTS

| | | | |
|---|---|---|---|
| 3,679,290 A * | 7/1972 | Adams et al. ............. 349/199 |
| 3,711,181 A * | 1/1973 | Adams et al. ............. 349/194 |
| 4,412,059 A | 10/1983 | Krigbaum et al. |
| 4,614,619 A | 9/1986 | Shannon |
| 4,634,637 A | 1/1987 | Oliver |
| 4,637,896 A * | 1/1987 | Shannon ............. 252/299.7 |
| 4,749,261 A * | 6/1988 | McLaughlin et al. ........ 349/16 |
| 4,786,148 A * | 11/1988 | Sekimura et al. ........... 349/106 |
| 4,898,786 A * | 2/1990 | Swofford ............. 428/480 |
| 4,973,511 A * | 11/1990 | Farmer et al. ............. 428/216 |
| 4,983,479 A | 1/1991 | Broer et al. |
| 5,016,985 A * | 5/1991 | Kalmanash et al. .......... 349/13 |
| 5,024,850 A | 6/1991 | Broer et al. |
| 5,024,895 A * | 6/1991 | Kavanagh et al. .......... 428/437 |
| 5,064,722 A * | 11/1991 | Swofford et al. .......... 428/447 |
| 5,082,738 A * | 1/1992 | Swofford ............. 428/437 |
| 5,145,746 A * | 9/1992 | Tomoyuki ............. 428/458 |
| 5,356,966 A | 10/1994 | Nesvadba |
| 5,367,008 A | 11/1994 | Nesvadba |
| 5,369,159 A | 11/1994 | Nesvadba |
| 5,428,162 A | 6/1995 | Nesvadba |
| 5,428,177 A | 6/1995 | Nesvadba |
| 5,488,117 A | 1/1996 | Nesvadba |
| 5,506,704 A | 4/1996 | Broer et al. |
| 5,529,817 A | 6/1996 | Smith, Jr. et al. |
| 5,599,478 A | 2/1997 | Matumoto et al. |
| 5,731,886 A | 3/1998 | Taber et al. |
| 5,757,564 A * | 5/1998 | Cross et al. ............. 359/870 |
| 5,780,629 A | 7/1998 | Etzbach |
| 5,788,880 A | 8/1998 | Schierlinger |
| 5,793,456 A | 8/1998 | Broer et al. |
| 5,833,880 A | 11/1998 | Siemensmeyer et al. |

(Continued)

FOREIGN PATENT DOCUMENTS

AU    576916 B    9/1988

(Continued)

OTHER PUBLICATIONS

PCT International Search Report for International Application No. PCT/US2006/020655 dated Nov. 23, 2006.

(Continued)

*Primary Examiner*—Vivian Chen

(57) ABSTRACT

Provided are multilayer laminates having one or more layers comprising twisted nematic liquid crystals and one or more layers of a polymeric sheet comprising a polymer with a modulus of 20,000 psi (138 MPa) or less. The twisted nematic liquid crystal layers reflect infrared radiation. Thus, the multilayer laminates are useful to reduce the transmission of infrared energy. For example, in some embodiments the multilayer laminates are useful as windows to reduce energy consumption necessary to cool the interior of a structure such as an automobile or building. Preferably, the multilayer laminates retain the beneficial properties of safety glass. The multilayer laminates may include additional layers such as infrared absorbing layers, half wave plates, and the like, to minimize the transmission of infrared energy. The multilayer laminates may also include further additional layers such as polymeric films, polymeric sheets, rigid sheets, and the like.

45 Claims, No Drawings

U.S. PATENT DOCUMENTS

| | | | |
|---|---|---|---|
| 5,886,075 | A | 3/1999 | Keane et al. |
| 5,908,674 | A * | 6/1999 | Schindler et al. ............... 428/34 |
| 5,940,150 | A * | 8/1999 | Faris et al. .................... 349/16 |
| 6,055,088 | A * | 4/2000 | Fix et al. ..................... 359/265 |
| 6,060,042 | A | 5/2000 | Schuhmacher |
| 6,252,788 | B1 | 6/2001 | Maesako et al. |
| 6,259,559 | B1 | 7/2001 | Kobayashi |
| 6,391,400 | B1 * | 5/2002 | Russell et al. ................. 428/34 |
| 6,417,902 | B1 | 7/2002 | Greenfield et al. |
| 6,432,522 | B1 | 8/2002 | Friedman |
| 6,466,297 | B1 | 10/2002 | Goulding et al. |
| 6,468,444 | B1 | 10/2002 | Meyer |
| 6,486,928 | B1 | 11/2002 | Lin et al. |
| 6,503,636 | B1 * | 1/2003 | Le Masson et al. ......... 428/472 |
| 6,630,974 | B2 | 10/2003 | Galabova et al. |
| 6,661,486 | B1 | 12/2003 | Faris et al. |
| 6,710,823 | B2 * | 3/2004 | Faris et al. .................... 349/16 |
| 6,723,395 | B2 | 4/2004 | May |
| 6,800,337 | B1 * | 10/2004 | Siemensmeyer et al. ..... 428/1.1 |
| 6,806,930 | B2 * | 10/2004 | Moia .......................... 349/117 |
| 6,831,720 | B2 | 12/2004 | Jiang et al. |
| 6,911,254 | B2 * | 6/2005 | Fisher et al. ................. 428/328 |
| 7,022,259 | B2 | 4/2006 | Lee |
| 7,098,359 | B2 | 8/2006 | Wellinghoff |
| 7,119,161 | B2 | 10/2006 | Lawandy |
| 7,160,611 | B2 * | 1/2007 | Banba et al. ................. 428/343 |
| 7,630,032 | B2 * | 12/2009 | Kirita et al. ................. 349/106 |
| 2001/0046595 | A1 * | 11/2001 | Moran et al. ................. 428/212 |
| 2002/0061395 | A1 * | 5/2002 | Moran et al. ................. 428/215 |
| 2002/0113921 | A1 | 8/2002 | Jiang et al. |
| 2003/0026922 | A1 | 2/2003 | May |
| 2004/0095531 | A1 | 5/2004 | Jiang et al. |
| 2004/0234778 | A1 | 11/2004 | Fukatani et al. |
| 2005/0089692 | A1 | 4/2005 | Anderson |
| 2005/0224754 | A1 | 10/2005 | Hirai |
| 2007/0116945 | A1 | 5/2007 | Goldfinger |
| 2007/0152188 | A1 * | 7/2007 | Silverman et al. ...... 252/299.01 |
| 2007/0154718 | A1 | 7/2007 | Silverman |
| 2007/0228326 | A1 * | 10/2007 | Goldfinger et al. ..... 252/299.01 |
| 2007/0267599 | A1 * | 11/2007 | Goldfinger et al. ..... 252/299.01 |
| 2009/0161061 | A1 | 6/2009 | Qi |

FOREIGN PATENT DOCUMENTS

| | | |
|---|---|---|
| DE | 43 16 611 A1 | 11/1993 |
| DE | 43 16 622 A1 | 11/1993 |
| DE | 43 16 876 A1 | 11/1993 |
| EP | 0 589 839 B1 | 5/2000 |
| EP | 0 591 102 B1 | 10/2000 |
| JP | 04 281 403 | 10/1992 |
| JP | 04-281403 * | 10/1992 |
| JP | 2000-028827 * | 1/2000 |
| JP | 2000/122059 | 4/2000 |
| JP | 2000-122059 * | 4/2000 |
| JP | 2005/031170 | 2/2005 |
| JP | 2005-31170 | 2/2005 |
| WO | WO 95/22586 | 8/1995 |
| WO | WO 95/24455 | 9/1995 |
| WO | WO 98/04651 | 2/1998 |
| WO | WO 98/44073 | 10/1998 |
| WO | WO 99/58334 | 11/1999 |
| WO | WO 01/60604 | 8/2001 |
| WO | WO 2009/023759 | 2/2009 |
| WO | WO 2009/023762 | 2/2009 |

OTHER PUBLICATIONS

Henkel Corporation, Matertial Safety Data Sheet for Hysol E-05CL Epoxy Adhesive—Ultra Clear, 29299_RESIN, Issue Date Mar. 7, 2006.
Henkel Corporation, Material Safety Data Sheet for Hysol E-30CL Epoxy Adhesive Ultra Clear Kit, 29330_RESIN, Issue Date Mar. 8, 2006.
Henkel Corporation, Material Safety Data Sheet for Hysol E-05CL Epoxy Adhesive—Ultra Clear, 29299_HARDENER, Issue Date Mar. 7, 2006.
Henkel Corporation, Material Safety Data Sheet for Hysol E-30CL Epoxy Adhesive Ultra Clear Kit, 29330_HARDENER, Issue Date Mar. 8, 2006.
Henkel Corporation, Material Safety Data Sheet for Hysol E-05CL Epoxy Adhesive—Ultra Clear, 29299_HARDENER, Issue Date Mar. 7, 2006.
Loctite Corporation, Technical Data Sheet for Hysol Product E-05CL, Aug. 2001.
Loctite Corporation, Technical Data Sheet for Hysol Product E-30CL, Aug. 2001.
Loctite Corporation, Technical Data Sheet for LOCTITE 3494, Nov. 2004.
Loctite Corporation, Material Safety Data Sheet for 3494 VIS/UV ADH 25ML SYR, Nov. 14, 2005.
Loctite Corporation, Material Safety Data Sheet for LOCTITE 349, Mar. 7, 2006.
Loctite Corporation, Technical Data Sheet for LOCTITE 349, Apr. 2006.
U.S. Appl. No. 12/242,211, filed Sep. 30, 2008, Qi.
U.S. Appl. No. 12/480,022, filed Jun. 8, 2009, Goldfinger.
U.S. Appl. No. 12/480,003, filed Jun. 8, 2009, Goldfinger.

* cited by examiner

MULTILAYER LAMINATES COMPRISING TWISTED NEMATIC LIQUID CRYSTALS

CROSS-REFERENCE TO RELATED APPLICATIONS

This application claims priority under 35 U.S.C. § 120 to U.S. Provisional Appln. Nos. 60/754,978, filed on Dec. 29, 2005; 60/754,904, filed on Dec. 29, 2005; 60/658,719, filed on May 27, 2005; 60/685,292, filed on May 26, 2005; and 60/754,678, filed on Dec. 29, 2005, each of which is incorporated herein by reference in its entirety.

BACKGROUND OF THE INVENTION

Several patents and publications are cited in this description in order to more fully describe the state of the art to which this invention pertains. The entire disclosure of each of these patents and publications is incorporated by reference herein.

Glass laminated products have contributed to society for almost a century. Beyond the well known, every day automotive safety glass used in windshields, laminated glass is used as windows for trains, airplanes, ships, and nearly every other mode of transportation. Safety glass is characterized by high impact and penetration resistance and does not scatter glass shards and debris when shattered.

Safety glass typically consists of a sandwich of two glass sheets or panels bonded together with an interlayer of a polymeric film or sheet, which is placed between the two glass sheets. One or both of the glass sheets may be replaced with optically clear rigid polymeric sheets, such as sheets of polycarbonate materials. Safety glass has further evolved to include multiple layers of glass and polymeric sheets bonded together with interlayers of polymeric films or sheets.

The interlayer is typically a relatively thick polymer sheet, which exhibits toughness and bondability to provide adhesion to the glass in the event of a crack or crash. In general, it is desirable that these polymeric interlayers possess a combination of characteristics including very high optical clarity, low haze, high impact resistance, high penetration resistance, excellent ultraviolet light resistance, good long term thermal stability, excellent adhesion to glass and other rigid polymeric sheets, low ultraviolet light transmittance, low moisture absorption, high moisture resistance, and excellent long term weatherability, among other requirements.

A more recent trend has been the use of glass-laminated products in the construction of homes and office structures. The use of architectural glass has expanded rapidly over the years as designers incorporated more glass surfaces into buildings. Threat resistance has become an ever-increasing requirement for architectural glass laminated products. These newer products are designed to resist both natural and man-made disasters. Examples of these needs include the recent developments of hurricane resistant glass, now mandated in hurricane susceptible areas, theft resistant glazings, and the more recent blast resistant glass-laminated products designed to protect buildings and their occupants. Some of these products have great enough strength to resist intrusion even after the glass laminate has been broken; for example, when a glass laminate is subjected to high force winds and impacts of flying debris as occur in a hurricane or where there are repeated impacts on a window by a criminal attempting to break into a vehicle or structure.

Society continues to demand more functionality from laminated glass products beyond the safety characteristics described above. One area of need is to reduce the energy consumption within the structure, such as an automobile or building, to which the laminated glass is applied. The sun's energy strikes the earth over a wide spectral range from 350 nm to 2,100 nm. Nearly half the energy is within the near infrared region of 750 nm to 2,100 nm. Removing the energy from the visible region would sacrifice visual transparency through windows and, therefore, detract from one of the advantages of windows. However, since the human eye does not sense the near infrared region, attempts have been made to prevent the transmission of the energy from the near infrared region through glass laminates by modifying the glass and/or the polymeric interlayer, by the addition of further layers or combinations thereof.

Liquid crystals are known to appear in many different forms, including the smectic, nematic and twisted nematic (or cholesteric or chiral nematic) forms. A comprehensive description of the structure of liquid crystals in general, and twisted nematic liquid crystals in particular is given in "The Physics of Liquid Crystals," P. G. de Gennes and J. Prost, Oxford University Press, 1995. Twisted nematic liquid crystalline materials are also disclosed in, for example; U.S. Pat. Nos. 3,679,290; 4,637,896; 6,300,454; 6,417,902; 6,486,338 and references disclosed therein. The presence of a chiral moiety within the liquid crystalline material induces the existence of twisted nematic phases. The chiral moiety can either be present in the liquid-crystalline molecule itself or can be added as a dopant to a nematic phase, thereby inducing the twisted nematic mesophase.

Liquid crystalline materials have been considered for use in glazings to control solar radiation. Devices that incorporate micellar liquid crystal materials (discrete particles of liquid crystal materials), within matrix materials generally exhibit haze at unacceptable levels for a transparent glazing. Continuous coatings and films of liquid crystalline materials (nonmicellar liquid crystalline materials), have been disclosed in U.S. Pat. Nos. 3,679,290; 5,731,886; 5,506,704; 5,793,456; 6,831,720; 6,630,974; 6,661,486; 6,710,823; 6,656,543; and 6,800,337. Liquid crystalline materials have also been used in window glazing units, as described in U.S. Pat. Nos. 5,156,452; 5,285,299; 5,940,150; 6,072,549; 6,369,868; 6,473,143; and 6,633,354, for example.

It is desirable to have a low-haze glazing unit that is effective in reducing the transmission of light, particularly light having wavelengths longer than those in the visible region, that is also an effective safety glass unit.

SUMMARY OF THE INVENTION

In one aspect, the present invention provides a multilayer laminate article for reflecting infrared radiation comprising:
  (a) at least one layer of a nonmicellar twisted nematic liquid crystal having cholesteric infrared-reflecting properties; and
  (b) at least one layer of a polymeric sheet comprising a polymer with a modulus of 20,000 psi (138 MPa) or less as measured by ASTM Method D-638, wherein at least one surface of at least one layer of the nonmicellar twisted nematic liquid crystal is in contact with at least one surface of at least one layer of the polymeric sheet.

In another aspect, the multilayer laminate article comprises at least two layers of the nonmicellar twisted nematic liquid crystal having cholesteric infrared-reflecting properties, at least one of which is a layer of a nonmicellar right handed twisted nematic liquid crystal and at least one of which is a layer of a nonmicellar left handed twisted nematic liquid crystal. In one embodiment there are equal numbers of nonmicellar right handed twisted nematic liquid crystal layers and nonmicellar left handed twisted nematic liquid crystal layers. In one such embodiment with equal numbers of right handed and left handed twisted nematic liquid crystal layers, for each nonmicellar right handed twisted nematic liquid crystal layer exhibiting reflection of light in a wavelength region of wavelength $\lambda_0$ there is a corresponding nonmicellar left handed twisted nematic liquid crystal layer exhibiting reflection of light at approximately the same wavelength region.

In another aspect, the at least one layer of the nonmicellar twisted nematic liquid crystal has a reflective bandwidth of greater than 100 nm, preferably greater than 120 nm and more preferably greater than 150 nm.

In another aspect, the multilayer laminate article further comprises at least one layer of a half-wave plate, wherein there is at least a first and a second layer of nonmicellar twisted nematic liquid crystals having identical handedness, and wherein at least one layer of a half-wave plate is positioned between the first and second layers of twisted nematic liquid crystals of identical handedness.

In one embodiment, the multilayer laminate article further comprises n layers of half-wave plates, wherein n is an integer, wherein there are n pairs of layers of the nonmicellar twisted nematic liquid crystal, each layer of a pair having identical handedness and each layer of a pair exhibiting reflection of light in the same wavelength region, and wherein a half-wave plate for the same wavelength $\lambda_0$ is positioned between each pair of layers of the nonmicellar twisted nematic liquid crystal having identical handedness, In another aspect, the multilayer laminate article further comprises at least one infrared absorptive layer.

The multilayer laminate articles may further comprise at least one layer of a polymeric film, at least one layer of rigid sheet, or both. Another embodiment comprises two layers of a polymer sheet and two layers of a rigid sheet.

The layer of a twisted nematic liquid crystal may take the form of a film. Preferably, the layer of a twisted nematic liquid crystal is in the form of a coating on the polymeric sheet, or of a coating on one of the other layers present in the laminate, e.g., the polymeric film, the rigid sheet or the half-wave plate. It is important to maintain the nonmicellar structure of the twisted nematic liquid crystal layer for the sake of laminate clarity and low haze.

Preferably, the layers of the multilayer laminate articles of the present invention transmit greater than 50% of visible light. More preferably, the multilayer laminate articles of the present invention transmit greater than 50% of visible light.

The multilayer laminate articles of the present invention reduce the energy requirements of the structure or article in which they are used or to which they are applied by reflecting undesired infrared radiation. The laminates of the present invention are particularly suitable for use as safety glass in automobile and construction applications, as well as other applications.

DETAILED DESCRIPTION OF THE INVENTION

The following definitions apply to the terms as used throughout this specification, unless otherwise limited in specific instances.

The term "(meth)acrylic", as used herein, alone or in combined form, such as "(meth)acrylate", refers to acrylic and/or methacrylic, for example, acrylic acid and/or methacrylic acid, or alkyl acrylate and/or alkyl methacrylate.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B". Exclusive "or" is designated herein by terms such as "either A or B" and "one of A or B", for example.

All percentages, parts, ratios, and the like set forth herein are by weight.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

The ability of liquid crystalline materials in twisted nematic phases to selectively reflect light in the infrared, visible or ultraviolet region is useful in many applications. When the propagation direction of plane polarized or unpolarized light is along the helical axis of the twisted nematic layer, the wavelength of maximum reflection, $\lambda_0$, is governed by the equation $\lambda_0 = n_a p$, wherein $n_a$ is the average of $n_o$ and $n_e$, and $n_o$ and $n_e$ are the ordinary and extraordinary refractive indices respectively of the twisted nematic phase measured in the propagation direction and p is the pitch of the helix (the distance the helix takes to repeat itself). Light outside the vicinity of $\lambda_0$ is essentially unaffected by the twisted nematic material. For light with a wavelength in the vicinity of wavelength $\lambda_0$, the twisted nematic phase exhibits selective reflection of the light such that approximately 50% of the light is reflected and approximately 50% of the light is transmitted assuming negligible absorption, with both the reflected and transmitted beams being substantially circularly polarized. A right-handed helix reflects right-handed circularly polarized light and transmits left-handed circularly polarized light. The bandwidth $\Delta\lambda$ of this reflected wavelength band centered about $\lambda_0$ can be determined by the formula $\Delta\lambda = \lambda_0 \cdot \Delta n/n_a$, where $\Delta n = n_e - n_o$, a manifestation of the inherent birefringence present in liquid crystal materials. The pitch p can be tuned effectively by manipulating the amount of chiral dopant, the twisting power of the dopant and the selection of nematic materials. The pitch is sensitive to temperature, unwinding or tightening with a change in temperature, to electric fields, dopants, and other environmental considerations. Thus, in the twisted nematic phase, manipulation of the pitch, and thus the wavelength of maximum reflection, can be accomplished with a wide variety of tools. Furthermore, the bandwidth $\Delta\lambda$ of the reflected wavelength band also can be manipulated as disclosed in U.S. Pat. Nos. 5,506,704 and 5,793,456. For conventional materials, typical bandwidths in the visible region are less than 90 nm.

Depending upon the intrinsic rotatory sense of the helical nature of the twisted nematic substance, i.e. whether it is right-handed or left-handed, the light that is transmitted is either right-hand circularly polarized light (RHCPL) or left-hand circularly polarized light (LHCPL). The transmitted light is circularly polarized with the same sense of polarization as that intrinsic to the helical nature of the substance. Thus, a twisted nematic liquid crystal having an intrinsic helical structure which is left-handed will transmit LHCPL and one that is right-handed will transmit RHCPL.

Hereinafter, in order to conform to popular convention, the twisted nematic liquid crystal substances will be identified by the kind of light that is reflected in the wavelength region around $\lambda_0$. When a layer is said to be right-handed it is meant that it reflects RHCPL and when a layer is said to be left-handed it is meant that it reflects LHCPL. A right-handed twisted nematic liquid crystal substance transmits LHCPL essentially completely at $\lambda_0$ whereas the same substance reflects RHCPL almost completely. Conversely a left-handed film is almost transparent to RHCPL at $\lambda_0$ and reflects LHCPL almost completely. Since plane polarized or unpolarized light contains equal amounts of RHCPL and LHCPL, a twisted nematic liquid crystal film is approximately 50 percent transmitting at $\lambda_0$ for these sources.

Twisted nematic liquid crystal layers have a further unique optical property. The circular polarization of the light that is reflected by a mirror is reversed. This same phenomenon does not occur with light reflected by these liquid crystal layers. The sense of the circularly polarization of light reflected from these liquid crystal substances is not reversed, but rather remains the same as it was before it came into contact with the liquid crystal substance. For example, if RHCPL having a wavelength $\lambda_0$ is directed at a right-handed layer for which $\lambda_0 = n_a p$ it is substantially completely reflected and after reflection remains RHCPL. If the same light were to be directed on a mirror the reflected light would be LHCPL.

In a solar control application, it is preferred that substantially all the light at some wavelengths be reflected. This is not possible for a single layer of a given composition, as it is required for both handednesses at said wavelength be reflected.

One method for reflecting substantially all of the light in the vicinity of $\lambda_0$ is to use a birefringent material in a thickness sufficient to reverse the handedness of the light that is transmitted through one twisted nematic layer, a so-called half-wave plate or film. Half-wave plates are discussed in detail in a book by E. Hecht, entitled "Optics", published by Addison-Wesley Publishing Company, Inc., 1990, on pages 301-303. A preferred method of using a half-wave film is, for example, to use two twisted nematic liquid crystal layers of similar $\lambda_0$ and identical handedness on either side of the half-wave film. In the case that right handed layers with similar $\lambda_0$ are used on both sides of the half-wave film, the first twisted nematic layer reflects RHCPL, the half-wave layer converts the transmitted LHCPL to RHCPL, which is subsequently reflected by the second right handed twisted nematic layer. As the RHCPL reflected from the second twisted nematic layer once again traverses the half-wave layer subsequent to its reflection, it is converted to LHCPL, which is then transmitted by the initial RHCPL film without modification. In this way substantially all of the incident light with a wavelength in the vicinity of $\lambda_0$ will be reflected by the laminate comprised of the two twisted nematic liquid crystal layers and the half-wave layer, with theoretically none being transmitted.

Another method for reflecting substantially all of the light in the vicinity of $\lambda_0$ is to use two twisted nematic liquid crystal layers with similar $\lambda_0$, one right handed and one left handed. The light in the region around $\lambda_0$ transmitted by the first layer will be reflected by the second layer so that substantially all of the incident light with a wavelength in the vicinity of $\lambda_0$ will be reflected by the laminate comprised of the two twisted nematic liquid crystal layers.

There are various ways to make a twisted nematic liquid crystal layer with a reflective bandwidth of greater than 100 nm, 120 nm, or 150 nm. Such a layer can be a composite of several sublayers of twisted nematic liquid crystal, each sublayer having a different $\lambda_0$ but with the different $\lambda_0$'s sufficiently close to result in an extended reflective bandwidth of greater than 100 nm for the composite layer. Another way that a reflective bandwidth of greater than 100 nm can be achieved is by using a twisted nematic liquid crystal layer with a gradient in the pitch, e.g., having a continuously varying pitch.

For some applications it will be advantageous to reflect radiation in the wavelength range of about 650 nm to 750 nm in addition to reflecting radiation in the near infrared region of 750 nm to 2,100 nm. For other applications it will be advantageous to reflect radiation in other parts of the visible spectrum in addition to reflecting radiation in the near infrared. Multiple twisted nematic films are useful for enabling reflections at the shorter wavelengths as well as those that are of primary interest here.

Compositions used in the twisted nematic liquid crystal layer of the multilayer laminates of the present invention comprise compounds which, alone or as a mixture, provide the layer with cholesteric infrared-reflecting properties and high transmittance in the visible region of the electromagnetic spectrum. In principle, virtually all known twisted nematic monomers, monomer mixtures, polymers, polymer mixtures or monomer and polymer mixtures can be adjusted in the pitch of their helical superstructure by varying the content and composition of the chiral component in such a way that the reflection maximum lies within the infrared (IR).

Alignment is used to create a uniform planar orientation, and is critical for high visible transmittance and low levels of haze. In order to make a twisted nematic liquid crystal layer fully reflective of the center wavelength while simultaneously keeping scattered light to a minimum, it is necessary to align the liquid crystal film into a single domain. When preferential alignment is not achieved, a multidomain layer results. Such a multidomain texture is called the focal conic state. The focal conic state is predominately characterized by its highly diffused light scattering appearance caused by an abrupt change of the refractive indices at the boundary between cholesteric domains. This texture has no single optic axis, and therefore scatters in all directions. The focal conic texture is typically milky-white (i.e. white light scattering). If alignment is achieved, a single domain can be produced. These are called homeotropic and planar states of alignment. In the homeotropic state of a nematic liquid crystal, the molecular axis lies perpendicular to the plane of the nematic layer. In the planar state of a twisted nematic material, the axis of this helix is perpendicular to the plane of the twisted nematic layer. Light with a wavelength matching the pitch of the helix is reflected from the surface of the film and therefore the reflected light does not pass through the layer. It is this domain structure that is therefore most preferred.

There are several well known ways to achieve planar alignment of the twisted nematic phase. It is possible to induce planar orientation of a liquid crystal material by using a substrate with a surface that has been rubbed directly, i.e. without applying an alignment layer. It is also possible to put the liquid crystal material on a substrate, clear or otherwise, apply a clear substrate to the free surface of the liquid crystal, and slide one substrate relative to the other, providing a small amount of shear to the liquid crystal film. This often induces a planar state of alignment where the helicoidal axis of the structure is substantially perpendicular to the film.

Orientation layers for liquid crystal films can consist of a polymer film that has been mechanically rubbed so that the directors of the liquid crystal molecules align themselves with the rubbing direction. A commonly used polymer is polyimide, which is deposited as the poly(amic-acid). The poly(amic-acid) is then thermally cured, converting the material to the polyimide. The hardness of the polyamide is controlled by the amount of thermal curing. The resulting polyimide layer can be rubbed as above.

It is also possible that directional orientation in a subsequently deposited nematic liquid crystal can be produced using a vapor deposited silica layer on a substrate. The substrate can be a transparent glass on which a thin transparent layer of an electrical conductor such as indium-tin-oxide (ITO) has been previously deposited. The substrate is moved past a magnetron in-line sputtering source during deposition. One or more passes may be required during silica deposition, and the resulting structure has the necessary directionality as long as the substrate moves back and forth along the same direction past the sputtering source. After the deposition of the silica layer, the silica-treated substrate may be contacted with an alcohol at a sufficiently high temperature to react the alcohol with the hydroxyl groups on the surface of the silica layer. The alcohol treatment may be made with the substrate above 100° C., and most typically 120° C. to 160° C. After the alcohol treatment, the liquid crystal is contacted to the treated surface and the liquid crystal layer to adopt a planar orientation.

Additional methods of aligning twisted nematic liquid crystals are known to those skilled in the art. In addition, using known processes, it is possible to create alignment of twisted nematic liquid crystal layers on substrates ranging from minute individual pieces to continuous films.

There are many types of twisted nematic liquid crystalline materials. Twisted nematic polymerizable monomers, wherein the chiral monomer or monomers are themselves liquid crystalline, are one general category. Such materials are described in U.S. Pat. No. 5,942,030, U.S. Pat. No. 5,780,629, U.S. Pat. No. 5,886,242 and U.S. Pat. No. 6,723,395. Another category is a mixture comprising at least one achiral, nematic, polymerizable monomer and a chiral compound. Examples of monomers and compounds of this type are described in U.S. Pat. No. 5,833,880, DE-A-4 408 170, and DE-A-4 405 316. Crosslinkable liquid crystalline polyorganosiloxanes, cyclic siloxanes, and tetraalkyldisiloxanes as are described in U.S. Pat. No. 4,388,453, U.S. Pat. No. 5,211,877, U.S. Pat. No. 6,300,454, U.S. Pat. No. 6,486,338, and U.S. Pat. No. 6,358,574, when combined with a chiral dopant comprise another category of twisted nematic liquid crystals. Additional classes of twisted nematic liquid crystals include twisted nematic cellulose derivatives as described in DE-A-197 136 38, crosslinkable twisted nematic copolyisocyanates as described in U.S. Pat. No. 5,847,068, and main chain polyesters as described in U.S. Pat. No. 6,107,447. These categories are exemplary and not limiting. It is contemplated that any twisted nematic liquid crystal composition that provides IR-reflecting properties and is mechanically and dimensionally stable under process and use conditions can be useful herein, whether currently known or later developed.

Preferred compositions for forming the polymer networks useful as the twisted nematic IR-reflecting liquid crystal layer are the bis (meth)acrylate liquid crystal compounds and combinations thereof.

A bis (meth)acrylate compound of one preferred type has the formula (I):

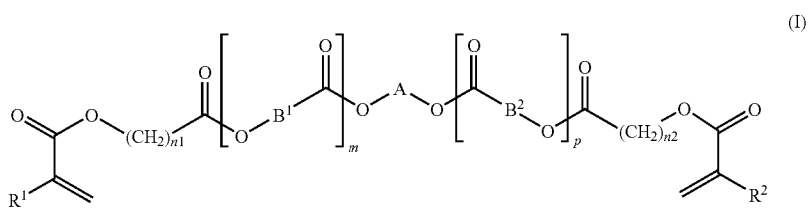

wherein $R^1$ and $R^2$ are each independently selected from the group: H, F, Cl and $CH_3$; n1 and n2 are each independently integers from 3 to 20; m and p are each independently integers 0, 1 or 2; A is a divalent radical selected from the group:

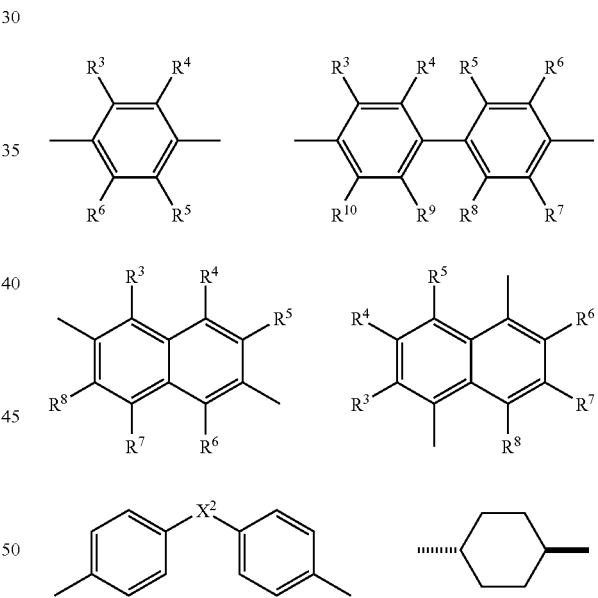

wherein $R^3$-$R^{10}$ are each independently selected from the group: H, C1-C8 straight or branched chain alkyl, C1-C8 straight or branched chain alkyloxy, F, Cl, phenyl, —C(O)CH$_3$, CN, and CF$_3$; $X^2$ is a divalent radical selected from the group: —O—, —(CH$_3$)$_2$C—, and —(CF$_3$)$_2$C—; and each $B^1$ and $B^2$ is a divalent radical independently selected from the group: $R^{11}$-substituted-1,4-phenyl, wherein $R^{11}$ is H, —CH$_3$ or —OCH$_3$; 2,6-naphthyl; and 4,4'-biphenyl; with the proviso that when m+p is equal to 3 or 4, at least two of $B^1$ and $B^2$ are $R^{11}$-substituted-1,4-phenyl.

A bis (meth)acrylate compound of another preferred type has the formula (II):

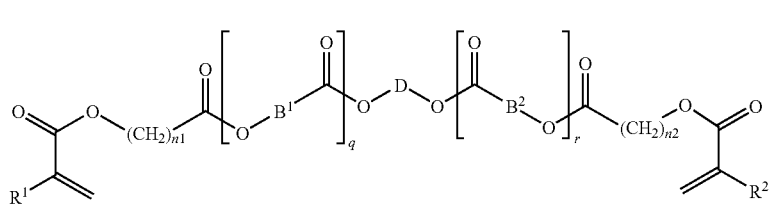

(II)

wherein $R^1$ and $R^2$ are each independently selected from the group: H, F, Cl and $CH_3$; n1 and n2 are each independently integers from 3 to 20; q and r are each independently integers 0, 1 or 2, with the proviso that $q+r \geq 1$; D is a divalent chiral radical selected from the group:

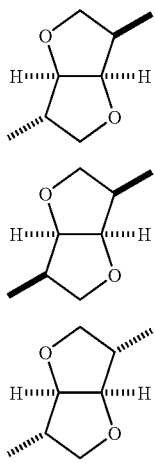

(D1)

(D2)

(D3)

-continued

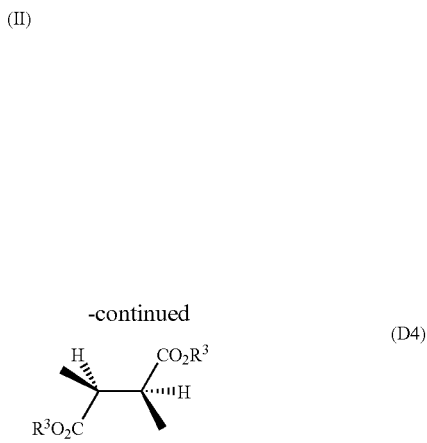

(D4)

wherein $R^3$ is a C1 to C6 straight or branched chain alkyl group; and each $B^1$ and $B^2$ is a divalent radical independently selected from the group: $R^4$-substituted-1,4-phenyl, wherein $R^4$ is H, —$CH_3$ or —$OCH_3$; 2,6-naphthyl; and 4,4'-biphenyl; wherein when $q+r=3$, at least one of $B^1$ and $B^2$ is $R^4$-substituted-1,4-phenyl; and when $q+r=4$, at least two of $B^1$ and $B^2$ are $R^{11}$-substituted-1,4-phenyl. In the phrase "each $B^1$ and $B^2$ is a divalent radical independently selected from the group", when $q=2$, the two $B^1$ units are selected independently, that is they may be the same or different; and when $r=2$, the two $B^2$ units are selected independently, that is they may be the same or different.

The most preferred bis (meth)acrylate compounds for forming a twisted nematic IR-reflecting liquid crystal layer are those with the formulas A through E and combinations thereof:

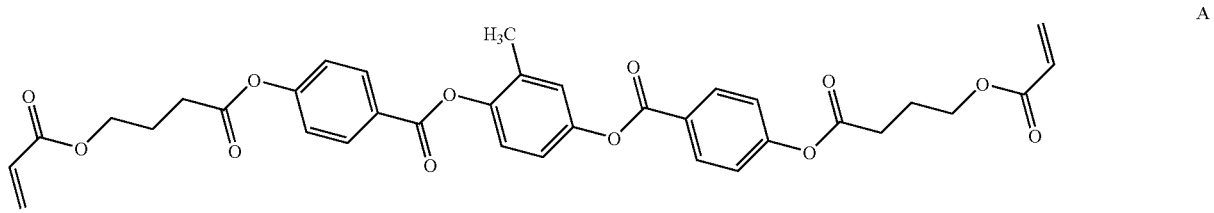

A

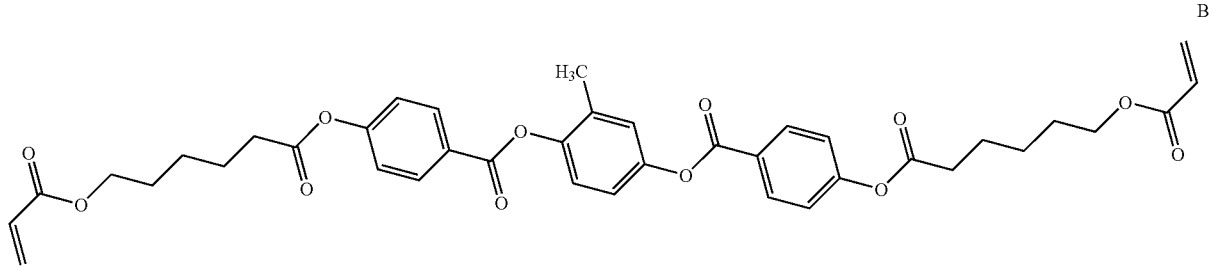

B

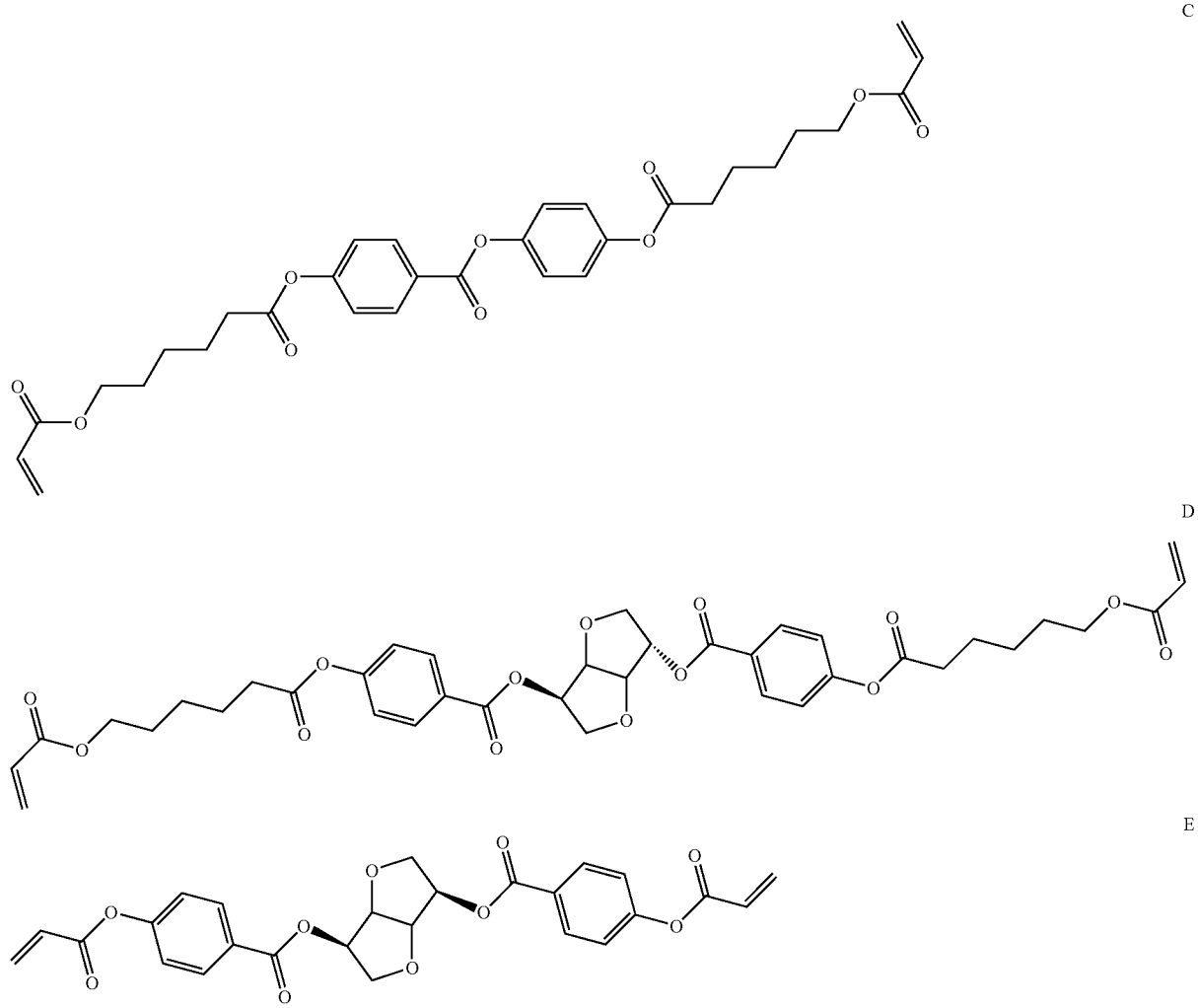

A process for making the compounds of formula (I) comprises: (a) providing one or more organic polyol(s) wherein each polyol comprises at least two hydroxyl groups and at least two covalently bonded carbon atoms, each hydroxyl group being bonded to a different carbon atom within an organic polyol; (b) reacting the organic polyol(s) with a sufficient amount of one or more functionalized alkyl acid halide(s) of the Formula (III):

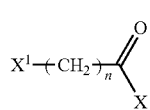
(III)

wherein X is Cl or Br; $X^1$ is selected from the group: Cl, Br, I, —OMs (wherein Ms is methanesulfonyl), —OTs (wherein Ts is toluenesulfonyl), and —OTf (wherein Tf is trifluoromethanesulfonyl); and n is an integer equal to 3 to 20; and a first reaction solvent at a first reaction temperature to provide one or more polyfunctionalized aryl alkanoate ester(s) and a first spent reaction mixture; and (c) reacting the one or more polyfunctionalized aryl alkanoate ester(s) with a sufficient amount of (meth)acrylate salt in the presence of a sufficient amount of phase transfer catalyst, and a second reaction solvent at a second reaction temperature; to provide one or more poly (meth)acrylate-aryl alkanoate ester(s) and a second spent reaction mixture.

A process for making the compounds of formula (II) comprises: (a) providing a chiral organic diol; (b) reacting the chiral organic diol with a sufficient amount of one or more functionalized alkyl acids or acid halide(s) of the formula (IV):

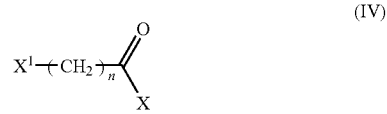
(IV)

wherein X is Cl, Br or OH; $X^1$ is selected from the group: Cl, Br, I, —OMs, —OTs, and —OTf (wherein Ms, Ts and Tf are as defined above); and n is an integer equal to 3 to 20; in a first reaction solvent at a first reaction temperature to provide one or more polyfunctionalized alkyl ester(s) and a first spent reaction mixture; (c) reacting the one or more polyfunctionalized alkyl ester(s) with a sufficient amount of (meth)acrylate salt in the presence of a sufficient amount of phase transfer catalyst, and a second reaction solvent at a second reaction temperature; to provide one or more poly (meth)acrylate-alkyl ester(s) and a second spent reaction mixture. Preferably, the process step (b) further comprises the uses of a base, and when X is OH, further comprises the use of a carbodiimide dehydrating agent. Step (c) preferably further comprises the use of one or more radical inhibitors.

For the purposes of the present invention, by crosslinkable or crosslinking it is meant the ability to covalently link or the covalent linking of polymeric compounds.

For the purposes of the present invention, polymerizable or polymerization means the ability to covalently link or the covalent linking of monomeric compounds to form polymers.

By curing is meant crosslinking, polymerization or the locking-in of the cholesteric phase. In the present invention, curing fixes the uniform orientation of the cholesteric molecules in the cholesteric layer.

Twisted nematic liquid crystal layers and/or compositions can be coated, adhered, or applied in any conventional manner, or in a non-conventional manner, that conforms to the purposes and design of the invention described herein. Suitable conventional methods for applying twisted nematic liquid crystal compositions to a substrate include, without limitation, lamination and the use of chemical adhesive agents. In addition, the twisted nematic IR-reflecting liquid crystal layer can be applied directly to a polymer sheet, a polymeric film or a glass substrate by customary or novel techniques. Examples of customary techniques include, but are not limited to, extrusion or co-extrusion; air knife coating; bar coating; squeeze coating; impregnating; reverse roll coating; transfer roll coating; gravure coating; kiss coating; casting, spraying; spin coating; or printing techniques such as letterpress, flexographic, intaglio, transfer printing, offset or screen printing.

In other embodiments, a twisted nematic liquid crystal composition can be formed into a film and applied to the polymer sheet serving as an interlayer.

The IR-reflecting layer can be applied in the form of a low-viscosity or high-viscosity mixture to a substrate, but preferably as a low-viscosity mixture. To this end the cholesteric mixtures can be applied to the substrate in undiluted or minimally diluted form at an elevated temperature or in a more diluted form at a low temperature.

The twisted nematic liquid crystal mixtures and formulations can be diluted with any suitable polymerizable diluent prior to their application to the substrate. Examples of suitable polymerizable diluents include, for example, 2-ethoxyethyl acrylate, diethylene glycol diacrylate, ethylene glycol dimethacrylate, diethylene glycol dimethacrylate, triethylene glycol dimethacrylate, diethylene glycol monomethyl ether acrylate, phenoxyethyl acrylate, tetraethylene glycol dimethacrylate, pentaerythritol tetraacrylate and ethoxylated pentaerythritol tetraacrylate. The amount of diluent should be kept sufficiently low to not disturb the twisted nematic phase.

In order to adjust the viscosity and the leveling behavior, it is possible for the cholesteric liquid crystal mixtures to be mixed with additional components. For example, it is possible to employ polymeric binders and/or monomeric compounds which can be converted into a polymeric binder by polymerization. Examples of suitable compounds are organic-solvent soluble polyesters, cellulose esters, polyurethanes and silicones, including polyether- or polyester-modified silicones. It is particularly preferred to employ cellulose esters such as cellulose acetobutyrate. However, if polymeric binders and/or monomeric compounds are included in the compositions useful in the present invention, it is desired to maintain the nonmicellar structure of the twisted nematic liquid crystal layer to preserve laminate clarity and low haze. The addition of small amounts of suitable leveling agents may also be advantageous. It is possible to employ them from about 0.005 to 1% by weight, in particular from 0.01 to 0.5% by weight, based on the amount of cholesteric liquid crystal in the mixture. Examples of suitable leveling agents are glycols, silicone oils and, in particular, acrylate polymers, such as the acrylate copolymers obtainable under the name Byk 361 or Byk 358 from Byk-Chemie USA of Wallingford, Conn., and the modified, silicone-free acrylate polymers obtainable under the name Tego Flow ZFS 460 from the Tego brand of Degussa AG through Degussa Goldschmidt of Hopewell, Va.

The cholesteric mixture may also include stabilizers to counter the effects of UV and weather. Examples of suitable additives are derivatives of 2,4-dihydroxybenzophenone, derivatives of 2-cyano-3,3-diphenyl acrylate, derivatives of 2,2', 4,4'-tetrahydroxybenzophenone, derivatives of ortho-hydroxyphenylbenzotriazole, salicylic esters, ortho-hydroxyphenyl-s-triazines or sterically hindered amines. These substances can be employed alone or, preferably, as mixtures.

The IR-reflecting layer(s) applied can be cured thermally, photochemically or by a beam of electrons. Curing will preferably take place while the material is in the cholesteric phase and with retention of the cholesteric phase. For photochemical polymerization, the cholesteric mixture may include customary commercial photoinitiators. For curing by electron beam, such initiators are not required.

Where two or more layers are applied, they can in each case be applied, dried, if desired, and cured individually. However, it is likewise possible to apply two or more, or all, of the layers to be applied in one application procedure, wet-on-wet, to the article that is to be coated, to carry out conjoint drying if desired and then to carry out conjoint curing. Casting techniques are particularly suitable for the simultaneous application of cholesteric layers, especially knife or bar casting techniques, cast-film extrusion or stripper casting techniques, and the cascade casting process.

The polymeric sheet of the present invention has a thickness of greater than about 10 mils (0.25 mm) to provide penetration resistance of the resulting laminate. Preferably, the polymeric sheet has a thickness of about 15 mils (0.38 mm), or greater to provide enhanced penetration resistance. More preferably, the polymeric sheet has a thickness of about 30 mils (0.75 mm), or greater to provide even greater enhanced penetration. Preferably, the total thickness of polymeric sheet component (all of the polymeric sheet thicknesses incorporated within a particular laminate) within the laminates of the present invention has a thickness of about 30 mils (0.75 mm) or greater to ensure adequate penetration resistance commonly regarded as a feature of safety laminates.

Suitable polymeric sheets are available commercially. Alternatively, suitable polymeric sheets may be formed by any suitable process, such as extrusion, calendering, solution casting or injection molding. The polymer sheet of the present invention is preferably formed by extrusion. Extrusion is particularly preferred for formation of "endless" products, such as films and sheets, which emerge as a continuous length.

For manufacturing large quantities of sheets, a sheeting calender is employed. The rough film is fed into the gap of the calender, a machine comprising a number of heatable parallel cylindrical rollers which rotate in opposite directions and spread out the polymer and stretch it to the required thickness. The last roller smoothes the sheet thus produced. If the sheet is required to have a textured surface, the final roller is provided with an appropriate embossing pattern. Alternatively, the sheet may be reheated and then passed through an embossing calender. The calender is followed by one or more cooling drums. Finally, the finished sheet is reeled up or cut into lengths and stacked.

The polymeric sheet of the present invention may have a smooth surface. Preferably, the polymeric sheet to be used as an interlayer within laminates has a roughened surface to effectively allow most of the air to be removed from between the surfaces of the laminate during the lamination process. This may be accomplished, for example, by mechanically embossing the sheet after extrusion, as described above, or by melt fracture during extrusion of the sheet and the like. For example, the as extruded sheet may be passed over a specially prepared surface of a die roll positioned in close proximity to the exit of the die which imparts the desired surface characteristics to one side of the molten polymer. Thus, when the surface of such roll has minute peaks and valleys, sheet formed of polymer cast thereon will have a rough surface on the side which contacts the roll which generally conforms respectively to the valleys and peaks of the roll surface. This rough surface is only temporary and particularly functions to facilitate deairing during laminating after which it is melted smooth from the elevated temperature and pressure associated with autoclaving and other lamination processes.

Biaxially stretched polymeric sheets are preferred.

In a preferred embodiment, the polymeric sheet comprises poly(vinyl butyral) having an average molecular weight range of from about 30,000 to about 600,000, preferably from about 45,000 to about 300,000, more preferably from about 200,000 to about 300,000 Daltons, as measured by size exclusion chromatography using low angle laser light scattering. More preferred is a poly(vinyl butyral) material comprising, on a weight basis, about 5 to about 30 percent, preferably about 11 to about 25 percent, and more preferably about 15 to about 22 percent, hydroxyl groups calculated as polyvinyl alcohol (PVOH). Further, a preferred poly(vinyl butyral) material comprises about 0 to about 10 percent, preferably about 0 to about 3 percent residual ester groups, calculated as polyvinyl ester, typically acetate groups, with the balance being butyraldehyde acetal. The poly(vinyl butyral) material may further comprise a minor amount of acetal groups other than butyral, for example, 2-ethyl hexanal, as disclosed in U.S. Pat. No. 5,137,954.

Poly(vinyl butyral) resins for use in the polymeric sheets of the multilayer laminates of the present invention may be produced by aqueous or solvent acetalization. In a solvent process, acetalization is carried out in the presence of sufficient solvent to dissolve the poly(vinyl butyral) formed and produce a homogeneous solution at the end of acetalization. The poly(vinyl butyral) is separated from solution by precipitation of solid particles with water, which are then washed and dried. Solvents used are lower aliphatic alcohols such as ethanol. In an aqueous process, acetalization is carried out by adding butyraldehyde to a water solution of poly(vinyl alcohol) at a temperature on the order of about 20° C. to about 100° C., in the presence of an acid catalyst, agitating the mixture to cause an intermediate poly(vinyl butyral) to precipitate in finely divided form and continuing the agitation while heating until the reaction mixture has proceeded to the desired end point, followed by neutralization of the catalyst, separation, stabilization and drying of the poly(vinyl butyral) resin.

In a preferred embodiment, the poly(vinyl butyral) material further comprises a plasticizer. The amount of plasticizer depends on the specific poly(vinyl butyral) resin and the properties desired for the laminate. Various plasticizers which can be used are known in the art, for example, as disclosed in U.S. Pat. No. 3,841,890, U.S. Pat. No. 4,144,217, U.S. Pat. No. 4,276,351, U.S. Pat. No. 4,335,036, U.S. Pat. No. 4,902,464, U.S. Pat. No. 5,013,779, and PCT publication WO 96/28504. Plasticizers commonly employed are esters of a polybasic acid or a polyhydric alcohol. Preferred plasticizers are triethylene glycol di-(2-ethyl butyrate), triethylene glycol di-2-ethylhexanoate, triethylene glycol di-n-heptanoate, oligoethylene glycol di-2-ethylhexanoate, tetraethylene glycol di-n-heptanoate, dihexyl adipate, dioctyl adipate, mixtures of heptyl and nonyl adipates, dibutyl sebacate, tributoxyethylphosphate, isodecylphenylphosphate, triisopropylphosphite, polymeric plasticizers such as the oil-modified sebacid alkyds, and mixtures of phosphates and adipates, and adipates and alkyl benzyl phthalates. Generally between about 15 to about 80 parts of plasticizer per hundred parts of resin, preferably about 25 to about 45 parts of plasticizer per hundred parts of resin are used. This latter concentration is generally used with poly(vinyl butyral) resins containing 17 to 25 percent vinyl alcohol by weight.

An adhesion control additive, for, for example, controlling the adhesive bond the polymeric sheet and in multilayer laminate embodiments of the present invention comprising a glass rigid layer, may also be utilized. These adhesive control additives are generally alkali metal or alkaline earth metal salts of organic and inorganic acids. Preferably, the adhesion control additives are alkali metal or alkaline earth metal salts of organic carboxylic acids having from 2 to 16 carbon atoms. More preferably, they are magnesium or potassium salts of organic carboxylic acids having from 2 to 16 carbon atoms. Examples of adhesion control additives include, but are not limited to, potassium acetate, potassium formate, potassium propanoate, potassium butanoate, potassium pentanoate, potassium hexanoate, potassium 2-ethylbutylate, potassium heptanoate, potassium octanoate, potassium 2-ethylhexanoate, magnesium acetate, magnesium formate, magnesium propanoate, magnesium butanoate, magnesium pentanoate, magnesium hexanoate, magnesium 2-ethylbutylate, magnesium heptanoate, magnesium octanoate, magnesium 2-ethylhexanoate and mixtures thereof. The adhesion control additive is typically used in the range of about 0.001 to about 0.5 weight percent based on the total weight of the polymeric sheet composition. Other additives, including but not limited to antioxidants, ultraviolet absorbers, ultraviolet stabilizers, thermal stabilizers, and colorants, may also be added to the polyvinyl butyral composition. See for example U.S. Pat. No. 5,190,826.

A plasticized poly(vinyl butyral) polymeric sheet for use in the multilayer laminates of the present invention may be formed by initially mixing poly(vinyl butyral) resin with plasticizer (and optionally other additives, such as described above for the coating matrix material), and then extruding the formulation through a sheet-shaping die, i.e. forcing molten, plasticized poly(vinyl butyral) through a horizontally long, vertically narrow die opening substantially conforming in length and width to that of the sheet being formed. Rough surfaces on one or both sides of the extruding sheet are provided by the design of the die opening and the temperature of the die exit surfaces through which the extrudate passes, as disclosed in, for example, U.S. Pat. No. 4,281,980. Alternative techniques for producing a rough surface on an extruding poly(vinyl butyral) sheet involve the specification and control of one or more of polymer molecular weight distribution, water content and melt temperature. Such techniques are disclosed in U.S. Pat. No. 2,904,844, U.S. Pat. No. 2,909,810, U.S. Pat. No. 3,679,788, U.S. Pat. No. 3,994,654, U.S. Pat. No. 4,161,565, U.S. Pat. No. 4,230,771, U.S. Pat. No. 4,292, 372, U.S. Pat. No. 4,297,262, U.S. Pat. No. 4,575,540, U.S. Pat. No. 5,151,234 and EPO 0185,863. Alternatively, the extruded sheet may be passed over a specially prepared surface of a die roll positioned in close proximity to the exit of the die which imparts the desired surface characteristics to one side of the molten polymer. Thus, when the surface of such a roll has minute peaks and valleys, sheet formed of polymer cast thereon will have a rough surface on the side which contacts the roll which generally conforms respectively to the valleys and peaks of the roll surface. Such die rolls are disclosed in, for example, U.S. Pat. No. 4,035,549. As is known, this rough surface is only temporary and particularly functions to facilitate de-airing during laminating after which it is melted smooth from the elevated temperature and pressure associated with autoclaving and other lamination processes.

Also preferred are polymeric sheets comprising poly(ethylene-co-vinyl acetate) resins. Suitable poly(ethylene-co-vinyl acetate) resins for use as polymeric sheets in the multilayer laminates of the present invention are commercially available from the Bridgestone Corporation, (10-1, Kyobashi 1-chrome, Chuo-ku, Tokyo 104-8340, Japan), the ExxonMobil Corporation, (5959 Las Colinas Boulevard, Irving, Tex., USA, 75039-2298), and the E. I. du Pont de Nemours and Company (1007 Market Street, Wilmington, Del., USA, 19898) (hereinafter "DuPont"). The poly(ethylene-co-vinyl acetate) resins preferably have a vinyl acetate level between about 10 to about 50 weight percent, more preferably between about 20 to about 40 weight percent, more preferably between about 25 to about 35 weight percent based on the weight of the total resin. Further, the poly(ethylene-co-vinyl acetate) resins may comprise other unsaturated comonomers. Examples of other unsaturated comonomers include, but are not limited to, methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, poly(ethylene glycol)acrylate, poly(ethylene glycol)methacrylate, poly(ethylene glycol) methyl ether acrylate, poly(ethylene glycol) methyl ether methacrylate, poly(ethylene glycol) behenyl ether acrylate, poly(ethylene glycol) behenyl ether methacrylate, poly(ethylene glycol) 4-nonylphenyl ether acrylate, poly(ethylene glycol) 4-nonylphenyl ether methacrylate, poly(ethylene glycol) phenyl ether acrylate, poly(ethylene glycol) phenyl ether methacrylate, dimethyl maleate, diethyl maleate, dibutyl maleate, dimethyl fumarate, diethyl fumarate, dibutyl fumarate, dimenthyl fumarate, vinyl propionate, acrylic acid, methacrylic acid, fumaric acid, maleic acid, maleic anhydride and mixtures thereof. Preferably, the other unsaturated comonomers are selected from the group consisting of methyl acrylate, methyl methacrylate, butyl acrylate, butyl methacrylate, glycidyl methacrylate, acrylic acid, methacrylic acid and mixtures thereof. Preferably, the ethylene copolymers of the present invention incorporate between about 0 and about 50 weight percent, more preferably between about 0 and about 25 weight percent, and more preferably about 0 weight percent of the other unsaturated comonomer, based on the total weight of the composition.

Like the polymeric sheet materials described supra, the poly(ethylene-co-vinyl acetate) resins may incorporate additives, such as thermal stabilizers, UV absorbers, UV stabilizers, plasticizers, organic peroxides, adhesion promoters and mixtures thereof. Further, any of the plasticizers described supra may be used with the poly(ethylene-co-vinyl acetate) resins. Examples of preferred plasticizers include, but are not limited to, polybasic acid esters and polyhydric alcohol esters, such as dioctyl phthalate, dihexyladipate, triethylene glycol-di-2-ethylbutylate, butyl sebacate, tetraethylene glycol heptanoate, triethylene glycol dipelargonate and mixtures thereof. Generally, the plasticizer level within the poly(ethylene-co-vinyl acetate) resin composition does not exceed about 5 weight percent based on the weight of the total composition.

Polymeric sheets of poly(ethylene-co-vinyl acetate) resin composition preferably further comprise an organic peroxide. Preferably, the organic peroxide has a thermal decomposition temperature of about 70° C. or greater in a half-life of 10 hours. More preferably, the organic peroxide has a thermal decomposition temperature of about 100° C. or greater. An appropriate organic peroxide may be selected by one skilled in the art based upon the sheet-forming temperature, the process for preparing the composition, the curing (bonding) temperature, the heat resistance of body to be bonded, and/or storage stability. Examples of preferred organic peroxides include, but are not limited to, 2,5-dimethylhexane-2,5-dihydroperoxide, 2,5-dimethyl-2 ,5-(t-butylperoxy)hexane-3-di-t-butylperoxide, t-butylcumyl peroxide, 2,5-dimethyl-2,5-di(t-butylperoxy)hexane, dicumyl peroxide, alpha, alpha'-bis(t-butylperoxyisopropyl)benzene, n-butyl-4,4-bis(t-butylperoxy)valerate, 2,2-bis(t-butylperoxy)butane, 1,1-bis(t-butylperoxy)cyclohexane, 1,1-bis(t-butylperoxy)-3,3,5-trimethylcyclohexane, t-butylperoxybenzoate, benzoyl peroxide, t-butylperoxyacetate, methyl ethyl ketone peroxide, 2,5-dimethyl-2,5-bis(t-butylperoxy)-3,3,5-trimethylcyclohexane, 1-bis(t-butylperoxy)cyclohexane, 2,5-dimethylhexyl-2,5-bisperoxybenzoate, t-butyl hydroperoxide, p-menthane hydroperoxide, p-chlorobenzoyl peroxide, hydroxyheptyl peroxide, chlorohexanone peroxide, octanoyl peroxide, decanoyl peroxide, lauroyl peroxide, cumyl peroxyoctoate, succinic acid peroxide, acetyl peroxide, t-butylperoxy(2-ethylhexanoate), m-toluoyl peroxide, t-butylperoxyisobutylate and 2,4-dichlorobenzoyl peroxide and mixtures thereof. Preferably, the organic peroxide level is within the range of from about 0.1 weight percent to about 5 weight percent, based on the total weight of the poly(ethylene-co-vinyl acetate) resin composition.

In embodiments wherein the poly(ethylene-co-vinyl acetate) resin is cured by light, the organic peroxide is replaced with a photoinitiator or photosensitizer. Preferably, the level of the photoinitiator is within the range of from about 0.1 weight percent to about 5 weight percent, based on the total weight of the poly(ethylene-co-vinyl acetate) resin composition. Examples of preferred photoinitiators include, but are not limited to, benzoin, benzophenone, benzoyl methyl ether, benzoin ethyl ether, benzoin isopropyl ether, benzoin isobutyl ether, dibenzyl, 5-nitroacenaphtene, hexachlorocyclopentadiene, p-nitrodiphenyl, p-nitroaniline, 2,4,6-trinitroaniline, 1,2-benzanthraquinone, 3-methyl-1,3-diaza-1,9-benzanthrone and mixtures thereof.

Polymeric sheets comprising poly(ethylene-co-vinyl acetate) resin may further comprise acryloyl(oxy) group containing compounds, methacryloyl(oxy) group containing compounds and/or epoxy group containing compounds for improvement or adjustment of various properties of the resin, such as, for example, mechanical strength, adhesion properties, optical characteristics such as transparency, heat resistance, light-resistance, rate of crosslinking and the like. These materials are preferably used at a level of about 50 weight percent or less, more preferably at a level of about 10 percent or less, more preferably at a level from about 0.1 weight percent to about 2 weight percent, based on the total weight of the poly(ethylene-co-vinyl acetate) resin composition. Examples of acryloyl(oxy) and methacryloyl(oxy) group containing compounds include, but are not limited to, derivatives of acrylic acid or methacrylic acid, such as esters and amides of acrylic acid or methacrylic acid. Examples of the ester residue include, but are not limited to, linear alkyl groups (e.g., methyl, ethyl, dodecyl, stearyl and lauryl), a cyclohexyl group, a tetrahydrofurfuryl group, an aminoethyl group, a 2-hydroxyethyl group, a 3-hydroxypropyl group, and a 3-chloro-2-hydroxtpropyl group. Further, the esters include esters of acrylic acid or methacrylic acid with polyhydric alcohol such as ethylene glycol, triethylene glycol, polypropylene glycol, polyethylene glycol, trimethylol propane and pentaerythritol. An exemplary amide is diacetone acrylamide. Examples of polyfunctional compounds include esters of plural acrylic acids or methacrylic acids with polyhydric alcohol such as glycerol, trimethylol propane or pentaerythritol. Examples of the epoxy group containing compounds include triglycidyl tris(2-hydroxyethyl) isocyanurate, neopentylglycol diglycidyl ether, 1,6-hexanediol diglycidyl ether, allyl glycidyl ether, 2-ethylhexyl glycidyl ether, phenyl glycidyl ether, phenol(ethyleneoxy)sub-5 glycidyl ether, p-tert-butylphenyl glycidyl ether, diglycidyl adipate, diglycidyl phthalate, glycidyl methacrylate and butyl glycidyl ether and mixtures thereof.

Polymeric sheets of poly(ethylene-co-vinyl acetate) resin may further comprise a silane coupling agent to enhance the adhesive strengths. Examples of preferred silane coupling agent include, but are not limited to, gamma-chloropropylmethoxysilane, vinyltriethoxysilane, vinyltris(beta-methoxyethoxy)silane, gamma-methacryl-oxypropylmethoxysilane, vinyltriacetoxysilane, gamma-glycidoxypropyltrimethoxysilane, gamma-glycidoxypropyltriethoxysilane, beta-(3,4-epoxycyclohexyl) ethyltrimethoxysilane, vinyltrichlorosilane, gamma mercaptopropylmethoxysilane, gamma-aminopropyl triethoxysilane, N-beta-(aminoethyl)-gamma-aminopropyl trimethoxysilane and mixtures thereof. These silane coupling agent materials are preferably used at a level of about 5 weight percent or less, more preferably used at a level within the range of from about 0.001 weight percent to about 5 weight percent, based on the total weight of the poly(ethylene-co-vinyl acetate) resin composition.

It is understood that the polymeric sheets used in the present invention may further comprise additives such as plasticizers, processing aides, flow enhancing additives, lubricants, pigments, dyes, flame retardants, impact modifiers, nucleating agents to increase crystallinity, antiblocking agents such as silica, thermal stabilizers such as, but not limited to those disclosed in U.S. Pat. No. 4,325,863, U.S. Pat. No. 4,338,244, U.S. Pat. No. 5,175,312, U.S. Pat. No. 5,216,052, U.S. Pat. No. 5,252,643, U.S. Pat. No. 5,356,966, U.S. Pat. No. 5,367,008, U.S. Pat. No. 5,369,159, U.S. Pat. No. 5,428,162, U.S. Pat. No. 5,428,177, U.S. Pat. No. 5,488, 117, U.S. Pat. No. 5,516,920, U.S. Pat. No. 5,607,624, U.S. Pat. No. 5,614,572, U.S. Pat. No. 5,693,829, U.S. Pat. No. 5,773,631, U.S. Pat. No. 5,814,692, U.S. Pat. No. 6,140,397, U.S. Pat. No. 6,521,681, U.S. Pat. No. 6,586,606, DE-A-431661 1, DE-A-4316622, DE-A-4316876, EP-A-0589839, and EP-A-0591102, UV absorbers, UV stabilizers, dispersants, surfactants, chelating agents, coupling agents, adhesives, primers and the like.

The polymeric film useful in the multilayer laminate articles of the present invention may be formed from any polymeric matrix material. Preferably, the polymeric film is a biaxially oriented poly(ethylene terephthalate) film, a cellulose acetate film or a polycarbonate film.

Preferably, one or both surfaces of the polymeric film may be treated to enhance the adhesion to the coating or to the polymeric sheet or both. This treatment may take any form known within the art, including adhesives, primers, such as silanes, flame treatments, plasma treatments, electron beam treatments, oxidation treatments, corona discharge treatments, chemical treatments, chromic acid treatments, hot air treatments, ozone treatments, ultraviolet light treatments, sand blast treatments, solvent treatments, and the like and combinations thereof.

The difference between a polymeric film and a polymeric sheet is the thickness, but there is no set industry standard as to when a film becomes a sheet. For purposes of this invention, a film has a thickness of about 10 mils (0.25 mm) or less. Preferably, the polymeric film has a thickness of between about 0.5 mils (0.012 millimeters (mm)), to about 10 mils (0.25 mm). More preferably, the polymeric film used in the invention has a thickness of about 1 mil (0.025 mm) to about 5 mils (0.13 mm). The thickness of the polymeric sheet used in the present invention has been described above.

It is understood that the polymeric sheets and films of the present invention may be used with additives known within the art. The additives may include plasticizers, processing aides, flow enhancing additives, lubricants, pigments, dyes, flame retardants, impact modifiers, nucleating agents to increase crystallinity, antiblocking agents such as silica, thermal stabilizers, UV absorbers, UV stabilizers, dispersants, surfactants, chelating agents, coupling agents, adhesives, primers and the like.

The rigid sheets useful in the laminates of the present invention may be glass or rigid transparent plastic sheets, such as, for example, polycarbonates, acrylics, polyacrylates, cyclic polyolefins, such as ethylene norbornene polymers, metallocene-catalyzed polystyrenes and the like and combinations thereof. Metal or ceramic plates may also be suitable, if transparency is not required for the laminate.

The term "glass" is meant to include not only window glass, plate glass, silicate glass, sheet glass, and float glass, but also includes colored glass, specialty glass which includes ingredients to control, for example, solar heating, coated glass with, for example, sputtered metals, such as silver or indium tin oxide, for solar control purposes and other specialty glasses. The type of glass to be selected for a particular laminate depends on the intended use.

Half-wave plates can be made of any birefringent material with a thickness such that RHCPL is converted to LHCPL, and visa versa. Examples of suitable birefringent films and sheets include, without limitation, inorganic single crystals, stretched polymer films, or nematic liquid crystal films. Known and conventional processes can be used to prepare stretched polymer films and nematic liquid crystal films. Suitable half wave film can be obtained commercially. For example, a Wave Retarder Film can be obtained from International Polarizer, Inc., 320 Elm Street, Marlborough, Mass.; OptiGrafix™ Half Wave Optical Light Retarder Base Film can be obtained from Grafix™ Plastics, 19499 Miles Rd., Cleveland, Ohio; and Mica Waveplates are commercially available from Karl Lambrecht Corporation, 4204 N. Lincoln Ave., Chicago, Ill.

An absorptive layer may comprise part of the multilayer laminate. The absorptive layer of the multilayer laminate articles may be in the form of a discrete film. In other embodiments the absorptive layer may be in the form of a coating on one or more of the twisted nematic liquid crystal layers, the polymeric sheets, the polymeric films and the rigid sheets. In still other embodiments the absorptive layer may be incorporated into one or more of the twisted nematic liquid crystal layers, the polymeric sheets, the polymeric films and the rigid sheets.

The absorptive material used in the present invention may incorporate inorganic infrared absorbers, organic infrared absorbers, or combinations thereof. Infrared absorptive materials, as used herein, means absorptive materials having a local maximum in the absorption spectra between 750 nm and 2100 nm. The absorptive material of the present invention may include as many absorptive components as needed to provide the spectral absorptive characteristics desired. Nanoparticles of inorganic infrared absorptive material are particularly useful in forming the absorptive layer. These inorganic infrared absorptive particles have a nominal particle size of less than about 200 nanometers (nm), preferably less than about 100 nm, more preferably less than about 50 nm, more preferably less than about 30 nm, and most preferably within the range of about 1 nm to about 20 nm. The small particle size is required due to the high refractive indices of the infrared absorptive nanoparticles and their relationship to clarity and haze within the uses thereof contemplated herein. Examples of the absorptive materials are found in U.S. Pat. No. 6,579,608. The inorganic infrared absorptive particles may be surface treated with, for example, a silane compound, a titanium compound or a zirconia compound, to improve properties such as water resistance, thermal oxidative stability, and dispersability.

Preferably, the inorganic infrared absorptive nanoparticles are selected from the group consisting of: antimony doped tin oxide, tin-doped indium oxide, lanthanum hexaboride ($LaB_6$), and mixtures thereof. For the tin oxide nanoparticles containing antimony, the antimony level is preferably in the range of about 0.1 weight percent to about 20 weight percent, more preferably in the range of about 5 weight percent to about 15 weight percent, and most preferably in the range of about 8 weight percent to about 10 weight percent, based on the total weight of the antimony tin oxide. For the indium oxide nanoparticles containing tin, the tin level is preferably in the range of from about 1 to about 15 atomic percent based on the sum of (Sn+In) atoms, more preferably from about 2 to about 12 atomic percent, i.e., the tin content in a molar ratio Sn/(Sn+In) is preferably from about 0.01 to about 0.15, more preferably from about 0.02 to about 0.12.

As disclosed supra, the inorganic infrared absorptive particles may be incorporated into another layer of a multilayer laminate of the present invention. Generally the inorganic infrared absorptive particles are incorporated within a matrix resin, which may be organic or inorganic. The matrix material may comprise a high polymer, a reactive oligomer, a reactive prepolymer, a reactive monomer or mixtures thereof. Preferably, the matrix material is transparent.

Matrix materials in the form of polymeric films coated with indium tin oxide are commercially available from Tomoegawa Paper Company, Ltd. (Tokyo, Japan). Matrix materials in the form of polymeric films coated with antimony tin oxide (ATO) are commercially available from the Sumitomo Osaka Cement Company of Tokyo, Japan. Matrix materials in the form of polymeric films which incorporate lanthanum hexaboride ($LaB_6$) nanoparticles are commercially available from Sumitomo Metal Mining Company (Tokyo, Japan).

Absorptive materials useful in the multilayer laminates of the present invention may also comprise organic infrared absorbents including, but not limited to, polymethine dyes, amminium dyes, imminium dyes, dithiolene-type dyes and rylene-type, phthalocyanine-type, and naphthalocyanine-type dyes and pigments, and combinations thereof.

In the case that the absorptive material is not located in the same layer as the twisted nematic reflective material, it is preferred that the twisted nematic reflector be located in a layer that is outboard to the absorptive layer, that is more toward the exterior of the building or structure in which the multilayer laminate of the invention is used, so that in the case where the reflected and absorbed bands of radiation overlap the overlapped band will be reflected rather than being absorbed. This leads to a decrease in the amount of energy that passes through the glazing because the glazing will not warm up as much as in the case in which the absorber is on the outboard side of the glazing.

Adhesives and primers may be used to enhance the bond strength between the laminate layers, if desired, as is generally known in the art. One of ordinary skill in the art would contemplate the desirability of using an adhesive or a primer in the present invention. For example, silane coupling agents may be applied to the films and sheets to enhance the adhesion between layers of the present invention. Specific examples of useful silane coupling agents are gammaglycidoxypropyltrimethoxysilane, or gamma-aminopropyltriethoxysilane. Typically, said silane coupling agents are added at a level of about 0.01 to about 5 weight percent based on the total weight of the film or sheet composition. An example of a preferred primer is polyallyl amine. Examples of adhesives are epoxy, acrylics and siloxane resins.

The adhesive or primer composition may comprise any adhesive known in the art. Specific examples of adhesives and primers which are useful in the present invention include, for example; gamma-chloropropylmethoxysilane, vinyltrichlorosilane, vinyltriethoxysilane, vinyltris(beta-methoxyethoxy)silane, gamma-methacryloxypropyltrimethoxysilane, beta-(3,4-epoxycyclohexyl)ethyl-trimethoxysilane, gammaglycidoxypropyltrimethoxysilane, vinyl-triacetoxysilane, gamma-mercaptopropyltrimethoxysilane, gamma-aminopropyltriethoxysilane, N-beta-(aminoethyl)-gamma-aminopropyl-trimethoxysilane, glue, gelatine, casein, starch, cellulose esters, aliphatic polyesters, poly(alkanoates), aliphatic-aromatic polyesters, sulfonated aliphatic-aromatic polyesters, polyamide esters, rosin/polycaprolactone triblock copolymers, rosin/poly(ethylene adipate) triblock copolymers, rosin/poly(ethylene succinate) triblock copolymers, poly(vinyl acetates), poly(ethylene-co-vinyl acetate), poly (ethylene-co-ethyl acrylate), poly(ethylene-co-methyl acrylate), poly(ethylene-co-propylene), poly(ethylene-co-1-butene), poly(ethylene-co-1-pentene), poly(styrene), acrylics, polyurethanes, sulfonated polyester urethane dispersions, nonsulfonated urethane dispersions, urethane-styrene polymer dispersions, non-ionic polvester urethane dispersions, acrylic dispersions, silanated anionic acrylate-styrene polymer dispersions, anionic acrylate-styrene disipersions, anionic acrylate-styrene-acrylonitrile dispersions, acrylate-acrylonitrile dispersions, vinyl chloride-ethylene emulsions, vinylpyrrolidone/styrene copolymer emulsions, carboxylated and noncarboxylated vinyl acetate ethylene dispersions, vinyl acetate homopolymer dispersions, polyvinyl chloride emulsions, polyvinylidene fluoride dispersions, ethylene acrylic acid dispersions, polyamide dispersions, anionic carboxylated or noncarboxylated acrylonitrile-butadiene-styrene emulsions and acrylonitrile emulsions, resin dispersions derived from styrene, resin dispersions derived from aliphatic and/or aromatic hydrocarbons, styrene-maleic anhydrides, and the like. Mixtures of adhesives may also be utilized. Essentially any adhesive or primer known will find utility within the present invention.

The use of some adhesives and primers can unexpectedly change the wavelength of peak reflection of the twisted nematic material. For instance, when some epoxy resin formulations are applied to the surface of the twisted nematic film and subsequently cured at elevated temperatures, the wavelength of peak reflection may move to longer wavelengths. In addition, some epoxy resins, when cured at room temperature resulting in no substantial change in the wavelength of peak reflection, can move to longer or shorter wavelengths in a subsequent heat treatment. Finally, because processing to form the finished laminates require elevated temperatures in order to sufficiently bond the materials to form stable laminates, some changes in the wavelength of peak reflection are sometimes seen as a result of this process as well. Shifts of 30 mn and even as large as 50 nm and 100 nm have been observed. An example of an adhesive or primer that can cause a shift in the wavelength of peak reflection is HySol™ E-05CL two-part epoxy, available from the Henkel-Loctite Corporation of Rocky Hill, Conn. An example of an adhesive or primer that may cause minimal shift in the wavelength of peak reflection is RTV-108, a siloxane resin material from the General Electric Company of Fairfield, Conn.

The processes to produce the laminate articles of the present invention may take many forms. One process to produce the multilayer laminate article of the present invention in the form of a polymeric sheet laminated to a polymeric film coated with the twisted nematic liquid crystal layer is as follows. The polymeric sheet may be lightly bonded to the film with the twisted nematic liquid crystal through a nip roll bonding process. In such a process, the polymeric film with the twisted nematic liquid crystal is supplied from a roll and first passes over a tension roll. The film with the twisted nematic liquid crystal may be subjected to moderate heating by passing through a heating zone, such as an oven. The polymeric sheet may also be supplied from a roll and first passes over a tension roll. The polymeric sheet may be subjected to moderate heating by passing through a heating zone, such as an oven. Heating should be to a temperature sufficient to promote temporary fusion bonding, i.e., to cause the surfaces of the polymeric sheet or the polymeric film to become tacky. Suitable temperatures are within the range of about 50° C. to about 120° C., with the preferred surface temperatures reaching about 65° C. The film with the twisted nematic liquid crystal is fed along with the polymeric sheet through nip rolls where the two layers are merged together under moderate pressure to form a weakly bonded laminate. If desired, the nip rolls may be heated to promote the bonding process. The bonding pressure exerted by the nip rolls may vary with the film materials, the polymeric materials, and the temperatures employed. Generally the bonding pressure will be within the range of about 10 psi (0.7 kg/sq cm), to about 75 psi (5.3 kg/sq cm), and is preferably within the range of about 25 psi (1.8 kg/sq cm), to about 30 psi (2.1 kg/sq cm). The tension of the polymeric sheet/film which incorporates the twisted nematic liquid crystal laminate is controlled by passage over an idler roll. Typical line speeds through the roll assembly are within the range of about 5 feet (1.5 m), to about 30 feet (9.2 m), per minute. Proper control of the speed and the tension tends to minimize wrinkling of the film with the twisted nematic liquid crystal. After bonding, the laminate is passed over a series of cooling rolls which ensure that the laminate taken up on a roll is not tacky. Process water cooling is generally sufficient to achieve this objective. Tension within the system may be further maintained through the use of idler rolls. Laminate articles made through this process will have sufficient strength to allow handling by laminators who may produce further laminate articles, such as glass laminates, which encapsulate this laminate.

The laminate article may be formed by conventional or non-conventional autoclave processes. In a typical conventional autoclave process, a glass sheet, an interlayer composed of a polymeric sheet, a polymeric film with the twisted nematic liquid crystal (either in the form of a coated layer or of a film), a second polymeric sheet, and a second glass sheet are laminated together under heat and pressure and a vacuum (for example, in the range of about 27-28 inches (689-711 mm) Hg), to remove air. Preferably, the glass sheets have been washed and dried. A typical glass is 90 mil thick annealed flat glass. Typically, the interlayer of the present invention, i.e. the polymeric sheet, the polymeric film with the twisted nematic liquid crystal, and the second polymeric sheet, is positioned between two glass plates to form a glass/interlayer/glass assembly. The laminated article at this stage is referred to as a "pre-press assembly." This pre-press assembly is placed into a bag capable of sustaining a vacuum ("a vacuum bag"). The air is drawn out of the vacuum bag using a vacuum line or other means of pulling a vacuum on the vacuum bag. The vacuum bag is sealed while maintaining the vacuum. The sealed bag is placed in an autoclave at a temperature of about 130° C. to about 180° C., at a pressure of about 200 psi (15 bars), for from about 10 to about 50 minutes. Preferably, the bag is autoclaved at a temperature of from about 120° C. to about 160° C. for 20 minutes to about 45 minutes. More preferably, the bag is autoclaved at a temperature of from about 135° C. to about 160° C. for 20 minutes to about 40 minutes. Still more preferably, the bag is autoclaved at a temperature of from about 145° C. to about 155° C. for 25 minutes to about 35 minutes. A vacuum ring may be substituted for the vacuum bag.

Alternatively, other processes may be used to produce the laminate articles of the present invention. Any air trapped within the glass/interlayer/glass assembly may be removed through a nip roll process. For example, the glass/interlayer/glass assembly may be heated in an oven at between about 80° C. and about 120° C., preferably between about 90° C. and about 100° C., for about 30 minutes. Thereafter, the heated glass/interlayer/glass assembly is passed through a set of nip rolls so that the air in the void spaces between the glass and the interlayer may be squeezed out, and the edge of the assembly is sealed.

This assembly may then placed in an air autoclave where the temperature is raised to between about 120° C. and about 160° C., preferably between about 135° C. and about 160° C., and pressure to between about 100 psig to about 300 psig, preferably about 200 psig (14.3 bar). These conditions are maintained for about 15 minutes to about 1 hour, preferably about 20 minutes to about 50 minutes, after which, the air is cooled while no more air is added to the autoclave. After about 20 minutes of cooling, the excess air pressure is vented and the laminates are removed from the autoclave.

As described above, the laminate articles of the present invention may include additional layers, such as other polymeric sheets, other coated or uncoated polymeric films, half-wave plates and absorptive layer.

The following examples are provided to describe the invention in further detail. These examples, which set forth a preferred mode presently contemplated for carrying out the invention, are intended to illustrate and not to limit the invention.

EXAMPLES OF THE INVENTION

Standard Alignment Layer Application Procedure

Glass plates were cleaned by placing them in a beaker with a solution of water and Micro-90 cleaning solution in a sonic bath. After sonication they were rinsed with deionized water and dried with a towel.

4 gm of Pyralin® P12555 was mixed with 12 gm of solvent thinner T9039 (both from HD Microsystems of Parlin, N.J.). A Headway Research PWM32 Spin Coater was used to coat the glass substrates with the polyimide solution. The glass plates were rinsed with isopropyl alcohol and spun until dryness prior to applying the polyimide solution. Polyimide solution was applied and spun according to the following program: 500 RPM for 5 sec, then 2000 RPM for 5 sec, then 5000 RPM for 30 sec. The plates were then put on a hot plate at 120° C. for 1 min., followed by a second hot plate at 150° C. for 1 min. to soft bake the polyimide. The polyimide was finally cured by placing the coated substrates in aluminum pans and heating them in air in a box furnace. The furnace was programmed to ramp from room temperature to 200° C. at 5° C./min., then hold at 200° C. for 30 min., then cool. Following this treatment, the box furnace was purged with nitrogen at a flow rate of 10 slpm, and the furnace was heated using the following program: room temperature (RT) to 200° C. at 4° C./min., hold at 200° C. for 30 min., then ramp from 200° C. to 300° C. at 2.5° C./min., then hold at 300° C. for 60 min. The glass plates were allowed cool in the oven for 2 hours 10 minutes to 88° C. and removed from the oven.

Standard Substrate-Rubbing Procedure

A rubbing process was used both directly on the poly (ethylene terephthalate) films and on the glass plates after the application of the alignment layer and before the application of the coating solution in order to ensure the formation of a planar texture. Each substrate was rubbed 20 times in the same direction using Rubbing Cloth YA-25-C available from the Yoshikawa Kako K.K. mounted on a 2.75" by 5.5" inch block under moderate hand pressure.

Standard Lamination Procedure

A pre-press assembly, in which all the layers in the laminate are cut to the same size and stacked in the desired order, is placed into a vacuum bag and heated at 90 to 100° C. for 30 minutes to remove any air contained between the layers of the pre-press assembly. The pre-press assembly is heated at 135° C. for 30 minutes in an air autoclave at a pressure of 200 psig (14.3 bar). The air is then cooled without adding additional gas, so that the pressure in the autoclave is allowed to decrease. After 20 minutes of cooling, when the air temperature is less than about 50° C., the excess pressure is vented, and the laminate is removed from the autoclave.

Preparative Example PE1

A composition consisting of 48 parts by weight of the cholesteric ester compound with the compositional structure

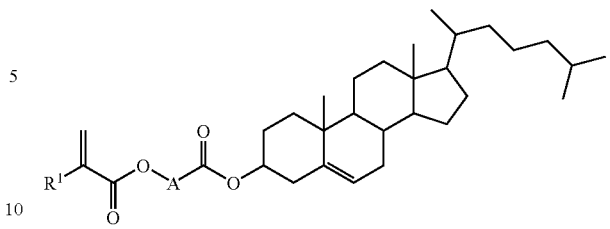

where $R_1$ is H and A is $-((CH_2)_5)-$, 48 parts by weight of the cholesteric ester compound with the same compositional structure shown above where $R_1$ is H and A is $-((CH_2)_2)-O-$, 3 parts by weight of trimethylolpropane triacrylate, and 1 part by weight of Irgacure™ 651 photoinitiator (Ciba Specialty Chemicals, Basel, Switzerland), are mixed together to form a colorless solution. The resulting solution is coated onto a rubbed, alignment-layer treated clear annealed float glass plate substrate (6 inches by 12 inches by 2.5 mm thick), using a doctor knife coating. The coating is cured by exposing the material to a 450 watt mercury vapor lamp for 30 seconds with the coated side facing the lamp. The result is a nonmicellar twisted nematic liquid crystal layer on the glass.

Preparative Example PE2

The colorless solution of PE1 is coated onto a rubbed biaxially oriented poly(ethylene terephthalate) film substrate (6 inches by 12 inches by 4 mils thick (0.004 inch)), using a doctor knife coating. The coating is cured by exposing the material to a 450 watt mercury vapor lamp for 30 seconds with the coated side facing the lamp. The result is a nonmicellar twisted nematic liquid crystal layer on the biaxially oriented poly(ethylene terephthalate) film.

Preparative Example PE3

The colorless solution of PE1 is coated onto a rubbed flametreated biaxially oriented poly(ethylene terephthalate) film substrate (6 inches by 12 inches by 4 mils thick (0.004 inch)), using a doctor knife coating. The coating is cured by exposing the material to a 450 watt mercury vapor lamp for 30 seconds with the coated side facing the lamp. The result is a nonmicellar twisted nematic liquid crystal layer on the flame-treated biaxially oriented poly(ethylene terephthalate) film.

Preparative Example PE4

The colorless solution of PE1 is coated onto the rubbed unprimed side of a single-side polyallyl amine-primed, biaxially oriented poly(ethylene terephthalate) film substrate (6 inches by 12 inches by 4 mils thick (0.004 inch)), using a doctor knife coating. The coating is cured by exposing the material to a 450 watt mercury vapor lamp for 30 seconds with the coated side facing the lamp. The result is a nonmicellar twisted nematic liquid crystal layer on the polyallyl amine-primed, biaxially oriented poly(ethylene terephthalate) film.

Preparative Example PE5

A composition consisting of 48 parts by weight of the cholesteric ester compound with the compositional structure shown in PE1 where $R_1$ is H and A is $-((CH_2)_5)-$, 48 parts by weight of the cholesteric ester compound with the same compositional structure shown above where $R_1$ is H and A is —(($CH_2$)$_6$)—O—, 3 parts by weight of trimethylolpropane triacrylate, and 1 part by weight of Irgacure™ 651 photoinitiator, are mixed together to form a colorless solution. The resulting solution is coated onto a rubbed, alignment-layer treated clear annealed float glass plate substrate (6 inches by 12 inches by 2.5 mm thick), using a doctor knife coating. The coating is cured by exposing the material to a 450 watt mercury vapor lamp for 30 seconds with the coated side facing the lamp. The result is a nonmicellar twisted nematic liquid crystal layer on the glass.

Preparative Example PE6

The colorless solution of PE5 is coated onto a rubbed biaxially oriented poly(ethylene terephthalate) film substrate (6 inches by 12 inches by 4 mils thick (0.004 inch)), using a doctor knife coating. The coating is cured by exposing the material to a 450 watt mercury vapor lamp for 30 seconds with the coated side facing the lamp. The result is a nonmicellar twisted nematic liquid crystal layer on the biaxially oriented poly(ethylene terephthalate) film.

Preparative Example PE7

The colorless solution of PE5 is coated onto the rubbed unprimed side of a single-sided polyallyl amine-primed, biaxially oriented poly(ethylene terephthalate) film substrate (6 inches by 12 inches by 4 mils thick (0.004 inch)), using a doctor knife coating. The coating is cured by exposing the material to a 450 watt mercury vapor lamp for 30 seconds with the coated side facing the lamp. The result is a nonmicellar twisted nematic liquid crystal layer on the polyallyl amine-primed, biaxially oriented poly(ethylene terephthalate) film.

Preparative Example PE8

A twisted nematic composition consisting of a nematic liquid crystal that has been doped with a chiral molecule is made when the following materials are mixed in the following proportions; 43.8 parts by weight component 1, 19.5 parts by weight component 2, 25.2 parts by weight component 3, 10 parts by weight component 4, 1 part by weight Irgacure® 369 photoinitiator, and 0.5 parts by weight FC171 (3M, St. Paul, Minn., USA). The resulting solution is coated onto a rubbed, alignment-layer treated float glass substrate using a wire wound rod. The solution is annealed at 60° C. for 30 seconds, and is subsequently polymerized by exposure to 360 nm UV radiation with the coated side facing the lamp for one minute at an intensity of 13 mW per square centimeter while under nitrogen atmosphere. The result is a nonmicellar twisted nematic liquid crystal layer on the glass.

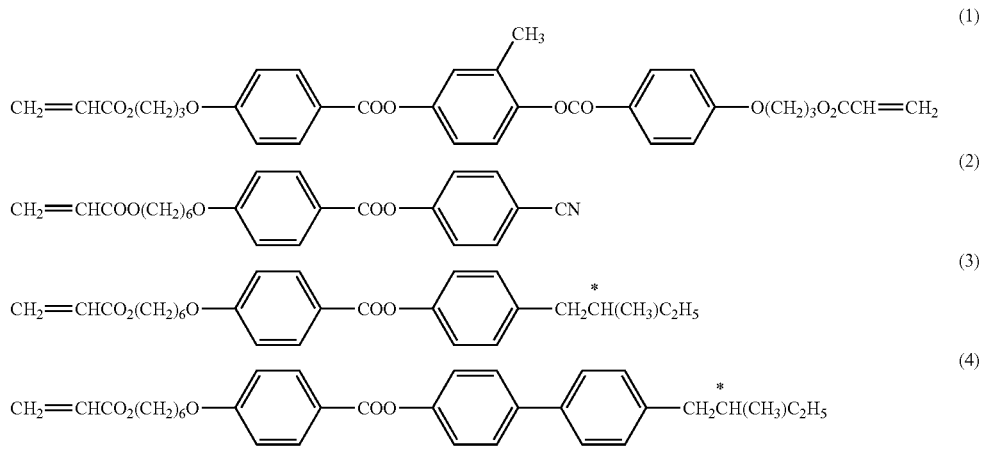

Preparative Example PE9

PE9 comprises a cured nonmicellar twisted nematic Solar Control Film (Chelix Technologies Corp., 520 Mercury Drive, Sunnyvale, Calif. 94085, USA), which has a reflection bandwidth greater than 100 nm and was coated onto a clear annealed float glass plate substrate (1 inch by 3 inches by 1 mm thick).

Preparative Example PE10

A twisted nematic film precursor solution, formulated such that the cured multilayer film has a reflection bandwidth greater than 100 nm, is made using the following process. Four cholesteric mixtures are made by combining compounds 1 and 2 in the ratios indicated in Table 1. Cellulose acetobutyrate is added to each cholesteric mixture in a concentration of 0.8% by weight based on the weight of the cholesteric mixture in order to improve layering, and the resulting mixtures are dissolved in butyl acetate. The photoinitiator 2,4,6-trimethylbenzoyl-diphenylphosphine oxide is added to each solution in a concentration of 1.5% by weight, based on the weight of the cholesteric mixture. Each solution is applied in turn to a rubbed biaxially oriented poly(ethylene terephthalate) film with a doctor blade in a wet-film thickness of 30 micrometers and crosslinked photochemically using an ultraviolet (UV) light source prior to the application of a subsequent sublayer layer. The composite nonmicellar twisted nematic liquid crystal layer comprised of the four sublayers is coated onto a biaxially oriented poly(ethylene terephthalate) film substrate (6 inches by 12 inches by 4 mils thick (0.004 inch)) to provide nonmicellar twisted nematic liquid crystal layer that has a reflection bandwidth greater than 100 nm on the biaxially oriented poly(ethylene terephthalate) film.

TABLE 1

| Solution number | Compound 1 | Compound 2 |
|---|---|---|
| 1 | .973 | .027 |
| 2 | .976 | .024 |
| 3 | .979 | .021 |
| 4 | .982 | .018 |

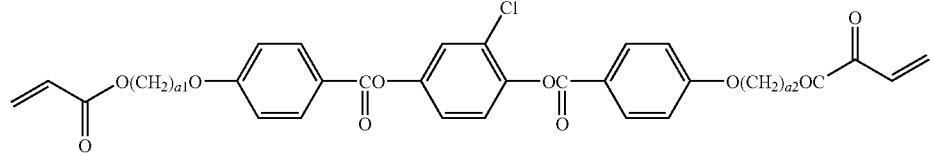

(1)

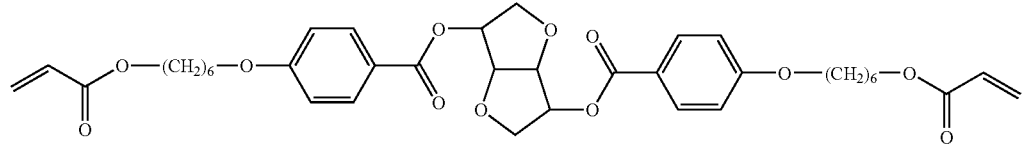

(2)

Preparative Example PE11

A coating solution for making a nonmicellar twisted nematic liquid crystal layer was prepared by using compounds with structures A-D (shown above) and Irgacure® 184 photoinitiator. Amounts of the ingredients shown in the table below were combined in 20 ml methylene chloride, stirred at room temperature for 10 minutes and subsequently filtered with 0.45 micron media into 5 separate vials. The methylene chloride was removed under reduced pressure. Subsequently, 2 ml 1-methoxy-2-propanol (Sigma-Aldrich Corporation, St.Louis, Mo.) was added to each vial and stirred until used.

| Compound | Weight |
|---|---|
| A | 1.25 g |
| B | 2.75 g |
| C | 0.60 g |
| D | 0.30 g |
| Irgacure 184 | 0.10 g |

Preparative Example PE12

A coating solution for making a nonmicellar twisted nematic liquid crystal layer was prepared essentially using the procedure described in PE11 and the amounts of ingredients shown in the table below except that 8 ml of methylene chloride was used. After the methylene chloride was removed under reduced pressure, 1.0 g of the resulting mixture was dissolved in 2 milliliters xylene.

| Compound | Weight |
|---|---|
| A | 0.50 g |
| B | 1.06 g |
| C | 0.30 g |
| D | 0.10 g |
| Irgacure 184 | 0.10 g |

Preparative Example PE13

A coating solution for making a nonmicellar twisted nematic liquid crystal layer was prepared essentially using the procedure described in PE11 and the amounts of ingredients shown in the table below except that 4 ml of methylene chloride was used.

| Compound | Weight |
|---|---|
| A | 0.47 g |
| B | 1.08 g |
| C | 0.30 g |
| D | 0.11 g |
| Irgacure 184 | 0.04 g |

Preparative Example PE14

A coating solution for making a nonmicellar twisted nematic liquid crystal layer was prepared essentially using the procedure described in PE11 and the amounts of ingredients shown in the table below. After the methylene chloride was removed under reduced pressure, 1.0 g of the resulting mixture was dissolved in 0.6 milliliters xylene.

| Compound | Weight |
|---|---|
| A | 0.13 g |
| B | 0.30 g |
| C | 0.09 g |
| E | 0.07 g |
| Irgacure 184 | 0.01 g |

Preparative Example PE15

A nonmicellar twisted nematic liquid crystal layer was coated onto the rubbed Mylar® 400D film using the solution prepared in PE11. The Mylar® film, still attached to the glass plate after the rubbing step, was affixed to the glass using tape.

About 0.25 milliliters of coating solution was applied to the Mylar® film. The coating solution was spread on the film by hand using a Gardco Adjustable Micrometer Film Applicator AP-M07(Paul N. Gardner Co., Inc., Pompano Beach, Fla.) set to ~1 mil in blade height. Immediately after coating, the Mylar® film was transferred to a hotplate and dried at 60° C. for 2 minutes. The coated Mylar® film was then transferred to a room temperature tabletop and covered with a 4 3/4"×4 3/4"×1 7/8" quartz box, equipped with a nitrogen purge of 2.5 liters per minute. After purging for 2 minutes, the sample was cured by irradiation from a longwave ultraviolet light lamp (Blak-Ray Model B 100, Mineralogical Research Company, San Jose, Calif.) for 2 minutes. A Varian Cary 5000 uv/vis/nir spectrometer was used to measure the reflectance. The maximum reflectance of the cured film occurred at a wavelength $\lambda_o$ of about 670 nm.

Preparative Example PE16

A nonmicellar twisted nematic liquid crystal layer was coated onto the rubbed Mylar® film essentially as described in PE15 except that the coating solution prepared in PE12 was used instead of that prepared in PE11. The maximum reflectance of the cured film occurred at a wavelength $\lambda_o$ of about 790 nm.

Preparative Example PE17

A nonmicellar twisted nematic liquid crystal layer was coated onto the rubbed Mylar® film essentially as described in PE15 except that the coating solution prepared in PE13 was used instead of that prepared in PE12 and a wire wound coating rod (#012, R. D. Specialties) was used to spread the coating solution. The maximum reflectance of the cured film occurred at a wavelength $\lambda_o$ of about 760 nm.

Preparative Example PE18

A nonmicellar twisted nematic liquid crystal layer was coated onto the rubbed Mylar® film essentially as described in PE17 except that the coating solution prepared in PE14 was used instead of that prepared in PE13. The maximum reflectance of the cured film occurred at a wavelength $\lambda_o$ of about 690 nm. This is a nonmicellar twisted nematic liquid crystal layer of opposite handedness of that prepared in PE17.

Preparative Example PE19

A 3×6 inch piece of Mylar® film coated with a nonmicellar twisted nematic liquid crystal layer produced essentially as described in PE17 was cut in half. The two 3×3 inch pieces were taped together along one edge of the coated substrates forming a hinge. The coated surfaces faced one another. Two part epoxy (Hysol® E-30CL, Loctite Corp.) was applied as a bead between the films at the hinged end, and the hinged pieces were placed between two 8×10 inch pieces of uncoated Mylar® 400D. This assembly was processed through a rubber-roll laminator (GBC 3500 Pro Series Laminator, GBC, Addison Ill.) to uniformly spread the adhesive between the two coated surfaces with the hinge end of the assembly entering the nip prior to the rest of the assembly. The assembly was then allowed to cure overnight. The two 8×10 inch pieces of uncoated Mylar® 400D were removed leaving the liquid crystal stack, i.e., Mylar® film coated with a liquid crystal polymer layer/adhesive/liquid crystal polymer layer coated on Mylar® film. The wavelength of maximum reflectance, $\lambda_o$, of the liquid crystal stack was unchanged at about 760 nm.

Preparative Example PE20

This Preparative Example was carried out essentially as described in PE19 with the exception that the two halves of the coated film were assembled with the coated surfaces facing away from one another, i.e., the uncoated surfaces of the Mylar® were facing. The wavelength of maximum reflectance, $\lambda_o$, of the liquid crystal stack, i.e., liquid crystal polymer layer coated on Mylar® film/adhesive/Mylar® film coated with a liquid crystal polymer layer, was unchanged at about 760 nm.

Preparative Example PE21

This Preparative Example was carried out essentially as described in PE19 with the exception that the two halves of the coated film were assembled with the coated surface of one facing the uncoated surface of the other. The wavelength of maximum reflectance, $\lambda_o$, of the liquid crystal stack, i.e., liquid crystal polymer layer coated on Mylar® film/adhesive/liquid crystal polymer layer coated on Mylar® film, was unchanged at about 760 nm.

Preparative Example PE22

This Preparative Example was carried out essentially as described in PE19 with the exception that the films taped together were a 3×6 inch Mylar® film coated with a nonmicellar twisted nematic liquid crystal layer produced essentially as described in PE16 and a similar film produced essentially as described in PE17. The resulting liquid crystal stack had two reflectance peaks, the positions of which were unchanged from the original coated films.

Preparative Example PE23

This Preparative Example was carried out essentially as described in PE19 with the exception that the films taped together were a 3×6 inch Mylar® film coated with a nonmicellar twisted nematic liquid crystal layer produced essentially as described in PE15 and a similar film produced essentially as described in PE18. The resulting liquid crystal stack had one reflectance peak larger in intensity than those of the original two films, the position of which was substantially unchanged from the original coated films.

Preparative Example PE24

A 3×3 inch piece of the material produced in PE17 and a section of Melinex 535 primed PET film were taped together along one edge forming a hinge. The coated surface of the coated film faced the Melinex 535. Two part epoxy (Hysol® E-30CL) was applied as a bead between the films at the hinged end, and the hinged pieces were placed between two 8×10 inch pieces of uncoated Mylar® 400D. This assembly was processed through a rubber-roll laminator (GBC 3500 Pro Series Laminator, GBC, Addison Ill.) to uniformly spread the adhesive between the coated surface and the Melinex 535 with the hinge end of the assembly entering the nip prior to the rest of the assembly. The assembly was then allowed to cure overnight. The two 8×10 inch pieces of uncoated Mylar® 400D were removed leaving the liquid crystal stack, i.e., Mylar® film coated with a liquid crystal polymer layer/adhesive/Melinex 535. The layer of Mylar® 400D was removed leaving the liquid crystal film adhered to the Melinex 535. The wavelength of maximum reflectance, $\lambda_o$, of the liquid crystal stack was unchanged.

Preparative Example PE25

A 3×3 inch piece of the material produced in PE24 and a 3×3 inch piece of the material produced in PE18 were taped together along one edge forming a hinge. The coated surfaces of the two films faced each other. Two part epoxy (Hysol® E-30CL) was applied as a bead between the films at the hinged end, and the hinged pieces were placed between two 8×10 inch pieces of uncoated Mylar® 400D. This assembly was processed through a rubber-roll laminator (GBC 3500 Pro Series Laminator, GBC, Addison Ill.) to uniformly spread the adhesive between the coated surface of the Mylar® 400D and the coated surface of the Melinex 535 with the hinge end of the assembly entering the nip prior to the rest of the assembly. The assembly was then allowed to cure overnight. The two 8×10 inch pieces of uncoated Mylar® 400D were removed leaving the liquid crystal stack, i.e., Mylar® film coated with a liquid crystal polymer layer/adhesive/liquid crystal polymer layer/adhesive/Melinex 535. The layer of Mylar® 400D was removed leaving the liquid crystal film adhered to the Melinex 535. The wavelength of maximum reflectance, $\lambda_0$, of the liquid crystal layers were unchanged.

Preparative Example PE26

A 3×3 inch piece of the material produced in PE24 and a 3×3 inch piece of the material produced in PE18 were taped together along one edge forming a hinge. The coated surface of the PE18 material faced the uncoated side of the material of PE24. Two part epoxy (Hysol® E-30CL) was applied as a bead between the films at the hinged end, and the hinged pieces were placed between two 8×10 inch pieces of uncoated Mylar® 400D. This assembly was processed through a rubber-roll laminator (GBC 3500 Pro Series Laminator) to uniformly spread the adhesive between the coated surface of the Mylar® 400D and the uncoated surface and the Melinex 535 with the hinge end of the assembly entering the nip prior to the rest of the assembly. The assembly was then allowed to cure overnight. The two 8×10 inch pieces of uncoated Mylar® 400D were removed leaving the liquid crystal stack, i.e., Mylar® film coated with a liquid crystal polymer layer/adhesive/liquid crystal polymer layer/adhesive/Melinex 535. The layer of Mylar® 400D was removed leaving the liquid crystal film adhered to both sides of the Melinex 535. The wavelength of maximum reflectance, $\lambda_0$, of the liquid crystal layers were unchanged.

Preparative Examples PE27, PE28, and PE29

These examples were produced using substantially the same process as Preparative Examples PE24, PE25, and PE26 respectively, with the exception that Hysol® E-05CL was substituted for Hysol® E-30CL. After room temperature curing overnight, the wavelength of maximum reflection was mostly unchanged from the original films. The stacked materials were subsequently heated to 130° C. for 15 minutes. The wavelengths of maximum reflection moved to longer wavelengths by more than 30 nm.

Preparative Example PE30

This example was produced using substantially the same process as Preparative Example PE27, with the exception that the epoxy adhesive was cured at 75C for one hour. After curing the wavelength of maximum reflectance had moved to longer wavelengths by over 50 nm relative to the same material cured at room temperature.

Example 1

A multilayer laminate composed of glass layer coated with a nonmicellar twisted nematic liquid crystal layer, a Butacite® BE-1030 polyvinyl butyral polymer sheet interlayer, and a biaxially oriented poly(ethylene terephthalate) film layer is produced in the following manner. The Butacite® polyvinyl butyral sheet (6 inches by 12 inches by 30 mils thick (0.030 inch)), and the biaxially oriented poly(ethylene terephthalate) film (6 inches by 12 inches), are conditioned at 23 percent relative humidity (RH), at a temperature of 72 degrees F. overnight. The layers are arranged to provide the nonmicellar twisted nematic liquid crystal layer coated on glass from PE1, the Butacite® polyvinyl butyral sheet layer, with the coated surface of the glass in contact with the Butacite® sheet layer, the biaxially oriented poly(ethylene terephthalate) film layer, a thin Teflon® film layer, and an annealed float glass layer (6 inches by 12 inches by 2.5 mm thick). The glass coated with the nonmicellar twisted nematic liquid crystal layer/Butacite® sheet/poly(ethylene terephthalate) film/Teflon® film/glass assembly is then laminated according to the standard procedure, and the glass coated with the nonmicellar twisted nematic liquid crystal layer/Butacite® sheet/polyester film/Teflon® film/glass assembly is removed from the autoclave. Removal of the glass cover sheet and the thin Teflon® film provides the coated glass sheet/Butacite® sheet/poly(ethylene terephthalate) film multilayer laminate of the present invention.

Example 2

A glass multilayer laminate composed of a glass layer coated with a nonmicellar twisted nematic liquid crystal layer, a Butacite® polyvinyl butyral polymer sheet interlayer, a biaxially oriented, flame treated poly(ethylene terephthalate) film layer, a Butacite® polyvinyl butyral polymer sheet interlayer, and a glass layer is produced in the following manner. The Butacite® polyvinyl butyral sheets (6 inches by 12 inches by 30 mils thick (0.030 inch)), and the biaxially oriented, flame treated poly(ethylene terephthalate) film (6 inches by 12 inches), are conditioned at 23 percent relative humidity (RH), at a temperature of 72 degrees F. overnight. The layers are arranged to provide the nonmicellar twisted nematic liquid crystal layer coated on glass made essentially as described in PE1, a Butacite® polyvinyl butyral sheet layer, with the coated surface of the glass in contact with the Butacite® sheet layer, the biaxially oriented poly(ethylene terephthalate) film layer, a Butacite® polyvinyl butyral sheet layer, and a clear annealed float glass layer (6 inches by 12 inches by 2.5 mm thick). The glass coated with the nonmicellar twisted nematic liquid crystal layer/Butacite® sheet/poly(ethylene terephthalate) film/Butacite® sheet/glass assembly is then laminated according to the standard procedure, and the glass coated with the nonmicellar twisted nematic liquid crystal layer/Butacite® sheet/poly(ethylene terephthalate) film/Butacite® sheet/glass multilayer laminate is removed from the autoclave.

Example 3

A glass multilayer laminate composed of a glass layer coated with a nonmicellar twisted nematic liquid crystal layer, an Evasafe™ polyethylene vinyl acetate polymer sheet interlayer and a glass layer is produced in the following manner. The Evasafe™ polyethylene vinyl acetate sheet (6 inches by 12 inches by 30 mils thick (0.030 inch)) is conditioned at 23 percent relative humidity (RH), at a temperature of 72 degrees F. overnight. The layers are arranged to provide the nonmicellar twisted nematic liquid crystal layer coated on glass made essentially as described in PE8, Evasafe™ polyethylene vinyl acetate sheet layer, with the coated surface of the glass in contact with the Evasafe™ sheet layer and a clear annealed float glass layer (6 inches by 12 inches by 2.5 mm thick). The glass coated with the nonmicellar twisted nematic liquid crystal layer/Evasafe™ sheet/glass assembly is then laminated according to the standard procedure, and the glass coated with the nonmicellar twisted nematic liquid crystal layer/Evasafe® sheet/glass multilayer laminate is removed from the autoclave.

Example 4

A glass multilayer laminate composed of two glass layers each coated with a nonmicellar twisted nematic liquid crystal layer and a Butacite® polyvinyl butyral interlayer polymer sheet is produced in the following manner. The Butacite® sheet (6 inches by 12 inches by 30 mils thick (0.030 inch)), is conditioned at 23 percent relative humidity (RH), at a temperature of 72 degrees F. overnight. The layers are arranged to provide one nonmicellar twisted nematic liquid crystal layer coated on glass made essentially as described in PE1, the Butacite® polyvinyl butyral sheet layer, and the other nonmicellar twisted nematic liquid crystal layer coated on glass made essentially as described in PE5 with the coated surfaces of both of the glass sheets in contact with the Butacite® sheet. The glass coated with the nonmicellar twisted nematic liquid crystal layer/Butacite® sheet/glass coated with the nonmicellar twisted nematic liquid crystal layer assembly is then laminated according to the standard procedure, and the glass coated with the nonmicellar twisted nematic liquid crystal layer/Butacite® sheet/glass coated with the nonmicellar twisted nematic liquid crystal layer multilayer laminate is removed from the autoclave.

Example 5

The nonmicellar twisted nematic liquid crystal layer on the biaxially oriented poly(ethylene terephthalate) film of PE2 is transfer printed onto a Butacite® polyvinyl butyral sheet in the following manner. The nonmicellar twisted nematic liquid crystal layer on the biaxially oriented poly(ethylene terephthalate) film is contacted with a surface of a Butacite(R) polyvinyl butyral sheet (6 inches by 12 inches by 15 mils thick (0.015 inch)) and a iron preheated to 100° C. is placed on the uncoated surface of the poly(ethylene terephthalate). After 1 minute, the iron is removed and the poly(ethylene terephthalate) film is removed. The result is a nonmicellar twisted nematic liquid crystal transfer printed on the Butacite® polyvinyl butyral sheet.

A glass multilayer laminate composed of a glass layer, the nonmicellar twisted nematic liquid crystal transfer printed on Butacite® polyvinyl butyral polymer sheet interlayer from above, a Butacite® polyvinyl butyral polymer sheet interlayer, and a glass layer is produced in the following manner. The Butacite® sheet (6 inches by 12 inches by 15 mils thick (0.015 inch)) and the Butacite® polyvinyl butyral sheet with the nonmicellar twisted nematic liquid crystal transfer printed on it are conditioned at 23 percent relative humidity (RH), at a temperature of 72 degrees F. overnight. The layers are arranged to provide a clear annealed float glass plate layer (6 inches by 12 inches by 2.5 mm thick), the nonmicellar twisted nematic liquid crystal transfer printed on the Butacite® sheet layer, the Butacite® polyvinyl butyral sheet layer, and a clear annealed float glass plate layer (6 inches by 12 inches by 2.5 mm thick). The nonmicellar twisted nematic liquid crystal coated surface of the transfer printed Butacite® sheet is in contact with the second Butacite® sheet. The glass/Butacite® sheet layer with the nonmicellar twisted nematic liquid crystal layer/Butacite® sheet layer/glass assembly is then laminated according to the standard procedure, and the glass/Butacite® sheet layer with the nonmicellar twisted nematic liquid crystal layer/Butacite® sheet layer/glass multilayer laminate is removed from the autoclave.

Example 6

A multilayer laminate composed of a glass layer, a Butacite®D BE-1030 polyvinyl butyral polymer sheet interlayer and the nonmicellar twisted nematic liquid crystal layer on the flametreated biaxially oriented poly(ethylene terephthalate) film of PE3 is produced in the following manner. The Butacite® polyvinyl butyral sheet (6 inches by 12 inches by 30 mils thick (0.030 inch)) and the flametreated biaxially oriented poly(ethylene terephthalate) film with the coated nonmicellar twisted nematic liquid crystal layer, are conditioned at 23 percent relative humidity (RH), at a temperature of 72 degrees F. overnight. The layers are arranged to provide a clear annealed float glass plate layer (6 inches by 12 inches by 2.5 mm thick), the Butacite®) polyvinyl butyral sheet layer, the nonmicellar twisted nematic liquid crystal layer on the flametreated biaxially oriented poly(ethylene terephthalate) film with the coated surface of the poly(ethylene terephthalate) film in contact with the Butacite® sheet, a thin Teflon® film layer, and an annealed float glass layer (6 inches by 12 inches by 2.5 mm thick). The glass sheeVButacite® sheet/nonmicellar twisted nematic liquid crystal layer on the flametreated biaxially oriented poly(ethylene terephthalate) film/Teflon® film/glass sheet assembly is then laminated according to the standard procedure, and the glass sheet/Butacite® sheeV nonmicellar twisted nematic liquid crystal layer on the flametreated biaxially oriented poly(ethylene terephthalate) film/Teflon® film/glass sheet assembly is removed from the autoclave. Removal of the glass cover sheet and the thin Teflon® film provides the glass sheet/Butacite® sheeV nonmicellar twisted nematic liquid crystal layer on the flametreated biaxially oriented poly(ethylene terephthalate) film multilayer laminate of the present invention Example 7

A glass multilayer laminate composed of a glass layer, a Butacite® polyvinyl butyral polymer sheet interlayer, the nonmicellar twisted nematic liquid crystal layer on the polyallyl amine-primed, biaxially oriented poly(ethylene terephthalate) film of PE4, a Butacite® polyvinyl butyral polymer sheet interlayer, and a glass layer is produced in the following manner. The two Butacite® polyvinyl butyral sheets (6 inches by 12 inches by 30 mils thick (0.030 inch)) and the polyallyl amine-primed, biaxially oriented poly(ethylene terephthalate) film with the coated nonmicellar twisted nematic liquid crystal layer are conditioned at 23 percent relative humidity (RH), at a temperature of 72 degrees F. overnight. The layers are arranged provide a clear annealed float glass plate layer (6 inches by 12 inches by 2.5 mm thick), a Butacite® polyvinyl butyral sheet layer, the nonmicellar twisted nematic liquid crystal layer on the polyallyl amine-primed, biaxially oriented poly(ethylene terephthalate) film, a Butacite® polyvinyl butyral sheet layer, and a clear annealed float glass plate layer (6 inches by 12 inches by 2.5 mm thick). The glass/Butacite® sheet/, the nonmicellar twisted nematic liquid crystal layer on the polyallyl amine-primed, biaxially oriented poly(ethylene terephthalate) film/Butacite® sheet/ glass assembly is then laminated according to the standard procedure, and the glass/Butacite® sheet/, the nonmicellar twisted nematic liquid crystal layer on the polyallyl amine-primed, biaxially oriented poly(ethylene terephthalate) film/Butacite® sheet/glass multilayer laminate is removed from the autoclave.

Example 8

A glass multilayer laminate composed of a glass layer, a 30 mil thick Evasafe™ polyethylene vinyl acetate polymer sheet interlayer, a nonmicellar twisted nematic liquid crystal layer on a polyallyl amine-primed, biaxially oriented poly(ethylene terephthalate) film made essentially as described in PE7, a 30 mil thick Evasafe™ polyethylene vinyl acetate polymer sheet interlayer, and a glass layer is produced essentially as described for Example 6.

Example 9

A multilayer laminate composed of a glass layer, an acoustic Butacite® polyvinyl butyral polymer sheet interlayer and the nonmicellar twisted nematic liquid crystal layer on the flametreated biaxially oriented poly(ethylene terephthalate) film prepared essentially as described in PE3 is produced essentially as described in Example 6 except that acoustic Butacite® polyvinyl butyral sheet is used.

Example 10

A cured twisted nematic Solar Control Film (Chelix Technologies Corp., 520 Mercury Drive, Sunnyvale, Calif. 94085, USA), which has a reflection bandwidth greater than 100 nm, from PE9, is laminated onto the smooth surface of a 15 mil thick Butacite® polyvinyl butyral (PVB) polymer sheet interlayer that is smooth on one side and rough on the other side.

Example 11

A multilayer laminate composed of a glass layer coated with a nonmicellar twisted nematic liquid crystal layer which has a reflection bandwidth greater than 100 nm, a Butacite® BE-1030 polyvinyl butyral polymer sheet interlayer and a biaxially oriented poly(ethylene terephthalate) film layer is produced essentially as described in Example 1 except that the coated glass of PE9 is used instead of the coated glass of PE1.

Example 12

A multilayer laminate composed of a glass layer coated with a nonmicellar twisted nematic liquid crystal layer which has a reflection bandwidth greater than 100 nm, a Butacite® polyvinyl butyral polymer sheet interlayer, a biaxially oriented, flame treated poly(ethylene terephthalate) film layer, a Butacite® polyvinyl butyral polymer sheet interlayer, and a glass layer is produced essentially as described in Example 2 except that a coated glass prepared essentially as described in PE9 is used instead of the coated glass of PE1.

Example 13

A multilayer laminate composed of a glass layer coated with a nonmicellar twisted nematic liquid crystal layer which has a reflection bandwidth greater than 100 nm, an Evasafe® polyethylene vinyl acetate polymer sheet interlayer and a glass layer is produced essentially as described in Example 3 except that coated glass prepared essentially as described in PE9 is used instead of the coated glass of PE8.

Example 14

A glass multilayer laminate composed of two glass layers coated with nonmicellar twisted nematic liquid crystal layers, each of which has a reflection bandwidth greater than 100 nm, and a Butacite® polyvinyl butyral interlayer polymer sheet is produced essentially as described in Example 4 except that coated glasses prepared essentially as described in PE9 are used instead of the coated glasses of PE1.

Example 15

A glass multilayer laminate composed of a glass layer, a nonmicellar twisted nematic liquid crystal which has a reflection bandwidth greater than 100 nm and has been transfer printed on a Butacite® polyvinyl butyral polymer sheet interlayer, a Butacite® polyvinyl butyral polymer sheet interlayer, and a glass layer is produced essentially as described in Example 5 except that the nonmicellar twisted nematic liquid crystal layer on the biaxially oriented poly(ethylene terephthalate) film of PE10 is transfer printed onto a Butacite® polyvinyl butyral sheet instead of that of PE2.

Example 16

A multilayer laminate composed of glass layer coated with a nonmicellar twisted nematic liquid crystal layer, a Butacite® BE-1030 polyvinyl butyral polymer sheet interlayer, and a "KH" film layer (6 inches by 12 inches) coated with lanthanum hexaboride contained within a binder (Sumitomo Metal Mining Company, Ltd.) is produced in the following manner. The Butacite® polyvinyl butyral sheet (6 inches by 12 inches by 30 mils thick (0.030 inch)), and the "KH" film are conditioned at 23 percent relative humidity (RH), at a temperature of 72 degrees F. overnight. The layers are arranged to provide the nonmicellar twisted nematic liquid crystal layer coated on glass prepared essentially as described in PE9, the Butacite® polyvinyl butyral sheet layer, with the coated surface of the glass in contact with the Butacite® sheet layer, the biaxially oriented poly(ethylene terephthalate) film layer, a "KH" film layer, a thin Teflon® film layer and an annealed float glass layer (6 inches by 12 inches by 2.5 mm thick). The glass coated with the nonmicellar twisted nematic liquid crystal layer/Butacite® sheet/poly(ethylene terephthalate) film/"KH" film/Teflon® film/glass assembly is then laminated according to the standard procedure, and the glass coated with the nonmicellar twisted nematic liquid crystal layer/Butacite® sheet/"KH" film/Teflon® film/glass assembly is removed from the autoclave. Removal of the glass cover sheet and the thin Teflon® film provides the coated glass sheet/Butacite® sheet/"KH" film multilayer laminate of the present invention, i.e., a multilayer laminate comprised of a glass layer coated with a nonmicellar twisted nematic liquid crystal layer having infrared-reflecting properties, a Butacite® polymer sheet and an infrared absorptive layer.

Example 17

A glass multilayer laminate composed of a glass layer, a nonmicellar twisted nematic liquid crystal which has a reflection bandwidth greater than 100 nm and has been transfer printed on a Butacite® polyvinyl butyral polymer sheet interlayer, a Butacite® polyvinyl butyral polymer sheet interlayer into which is incorporated 0.20 weight percent (based on the weight of the total sheet composition) of a polymethine-type infrared absorber, and a glass layer is produced essentially as described in Example 15.

Example 18

A glass multilayer laminate composed of a glass layer, the nonmicellar twisted nematic liquid crystal coated on the Butacite® polyvinyl butyral polymer sheet interlayer of Example 5, a Butacite® polyvinyl butyral polymer sheet interlayer into which is incorporated 0.20 weight percent (based on the weight of the total sheet composition) of a phthalocyanine-type infrared absorber, and a glass layer is produced essentially as described in Example 5 except that the coated Butacite® sheet of Example 10 is used instead of the Butacite® sheet of containing the infrared absorber is used instead of the plain. Butacite® sheet of Example 5.

Example 19

A glass multilayer laminate composed of a glass layer, a Butacite® polyvinyl butyral polymer sheet interlayer, an adhesively-bonded non-micellar liquid crystal bilayer film layer, a Butacite® polyvinyl butyral polymer sheet interlayer, and a glass layer is produced in the following manner. The Butacite® polyvinyl butyral sheets (6 inches by 12 inches by 30 mils thick (0.030 inch)), and adhesively-bonded non-micellar liquid crystal bilayer film layer from PE19 (6 inches by 12 inches), are conditioned at 23 percent relative humidity (RH), at a temperature of 72 degrees F. overnight. The layers are arranged to provide a layer of glass, a Butacite® polyvinyl butyral sheet layer, the adhesively-bonded non-micellar liquid crystal bilayer film layer from PE19, a Butacite® polyvinyl butyral sheet layer, and a clear annealed float glass layer (6 inches by 12 inches by 2.5 mm thick). The glass/Butacite® polyvinyl butyral sheet/adhesively-bonded non-micellar liquid crystal bilayer/Butacite® polyvinyl butyral sheet/glass is then laminated according to the standard procedure, and the glass/Butacite® polyvinyl butyral sheet/adhesively-bonded non-micellar liquid crystal bilayer/Butacite® polyvinyl butyral sheet/glass multilayer laminate is removed from the autoclave.

Example 20

A glass multilayer laminate composed of a glass layer, a Butacite® polyvinyl butyral polymer sheet interlayer, an adhesively-bonded non-micellar liquid crystal bilayer film layer, a Butacite® polyvinyl butyral polymer sheet interlayer, and a glass layer is produced in the following manner. The Butacite® polyvinyl butyral sheets (6 inches by 12 inches by 30 mils thick (0.030 inch)), and adhesively-bonded non-micellar liquid crystal bilayer film layer from PE20 (6 inches by 12 inches), are conditioned at 23 percent relative humidity (RH), at a temperature of 72 degrees F. overnight. The layers are arranged to provide a layer of glass, a Butacite® polyvinyl butyral sheet layer, the adhesively-bonded non-micellar liquid crystal bilayer film layer from PE20, a Butacite® polyvinyl butyral sheet layer, and a clear annealed float glass layer (6 inches by 12 inches by 2.5 mm thick). The glass/Butacite® polyvinyl butyral sheet/adhesively-bonded non-micellar liquid crystal bilayer/Butacite® polyvinyl butyral sheet/glass is then laminated according to the standard procedure, and the glass/Butacite® polyvinyl butyral sheet /adhesively-bonded non-micellar liquid crystal bilayer/Butacite® polyvinyl butyral sheet/glass multilayer laminate is removed from the autoclave.

Example 21

A glass multilayer laminate composed of a glass layer, a Butacite® polyvinyl butyral polymer sheet interlayer, an adhesively-bonded non-micellar liquid crystal bilayer film layer, a Butacite® polyvinyl butyral polymer sheet interlayer, and a glass layer is produced in the following manner. The Butacite® polyvinyl butyral sheets (6 inches by 12 inches by 30 mils thick (0.030 inch)), and adhesively-bonded non-micellar liquid crystal bilayer film layer from PE21 (6 inches by 12 inches), are conditioned at 23 percent relative humidity (RH), at a temperature of 72 degrees F. overnight. The layers are arranged to provide a layer of glass, a Butacite® polyvinyl butyral sheet layer, the adhesively-bonded non-micellar liquid crystal bilayer film layer from PE21, a Butacite® polyvinyl butyral sheet layer, and a clear annealed float glass layer (6 inches by 12 inches by 2.5 mm thick). The glass/Butacite® polyvinyl butyral sheet/adhesively-bonded non-micellar liquid crystal bilayer/Butacite® polyvinyl butyral sheet/glass is then laminated according to the standard procedure, and the glass/Butacite® polyvinyl butyral sheet /adhesively-bonded non-micellar liquid crystal bilayer/Butacite® polyvinyl butyral sheet/glass multilayer laminate is removed from the autoclave.

Example 22

A glass multilayer laminate composed of a glass layer, a Butacite® polyvinyl butyral polymer sheet interlayer, an adhesively-bonded non-micellar liquid crystal bilayer film layer, a Butacite® polyvinyl butyral polymer sheet interlayer, and a glass layer is produced in the following manner. The Butacite® polyvinyl butyral sheets (6 inches by 12 inches by 30 mils thick (0.030 inch)), and adhesively-bonded non-micellar liquid crystal bilayer film layer from PE22 (6 inches by 12 inches), are conditioned at 23 percent relative humidity (RH), at a temperature of 72 degrees F. overnight. The layers are arranged to provide a layer of glass, a Butacite® polyvinyl butyral sheet layer, the adhesively-bonded non-micellar liquid crystal bilayer film layer from PE22, a Butacite® polyvinyl butyral sheet layer, and a clear annealed float glass layer (6 inches by 12 inches by 2.5 mm thick). The glass/Butacite® polyvinyl butyral sheet/adhesively-bonded non-micellar liquid crystal bilayer/Butacite® polyvinyl butyral sheet/glass is then laminated according to the standard procedure, and the glass/Butacite® polyvinyl butyral sheet/adhesively-bonded non-micellar liquid crystal bilayer/Butacite® polyvinyl butyral sheet/glass multilayer laminate is removed from the autoclave.

Example 23

A glass multilayer laminate composed of a glass layer, a Butacite® polyvinyl butyral polymer sheet interlayer, an adhesively-bonded non-micellar liquid crystal bilayer film layer, a Butacite® polyvinyl butyral polymer sheet interlayer, and a glass layer is produced in the following manner. The Butacite® polyvinyl butyral sheets (6 inches by 12 inches by 30 mils thick (0.030 inch)), and adhesively-bonded non-micellar liquid crystal bilayer film layer from PE23 (6 inches by 12 inches), are conditioned at 23 percent relative humidity (RH), at a temperature of 72 degrees F. overnight. The layers are arranged to provide a layer of glass, a Butacite® polyvinyl butyral sheet layer, the adhesively-bonded non-micellar liquid crystal bilayer film layer from PE23, a Butacite(D polyvinyl butyral sheet layer, and a clear annealed float glass layer (6 inches by 12 inches by 2.5 mm thick). The glass/Butacite® polyvinyl butyral sheet/adhesively-bonded non-micellar liquid crystal bilayer/Butacite® polyvinyl butyral sheet/glass is then laminated according to the standard procedure, and the glass/Butacite® polyvinyl butyral sheet/adhesively-bonded non-micellar liquid crystal bilayer/Butacite® polyvinyl butyral sheet/glass multilayer laminate is removed from the autoclave.

Example 24

A glass multilayer laminate composed of a glass layer, a Butacite® polyvinyl butyral polymer sheet interlayer, a non-micellar liquid crystal film layer on PET film, a second Butacite® polyvinyl butyral polymer sheet interlayer, a second non-micellar liquid crystal film layer on PET film, a third Butacite® polyvinyl butyral polymer sheet interlayer and a glass layer is produced in the following manner. The Butacite® polyvinyl butyral sheets (6 inches by 12 inches by 30 mils thick (0.030 inch)), and two non-micellar liquid crystal film layers on PET film from PE15 and PE16 (6 inches by 12 inches), are conditioned at 23 percent relative humidity (RH), at a temperature of 72 degrees F. overnight. The layers are arranged to provide a layer of glass, a Butacite® polyvinyl butyral sheet layer, the non-micellar liquid crystal layer on PET film from PE15, a Butacitee polyvinyl butyral sheet layer, the non-micellar liquid crystal layer on PET film from PE16 where the liquid crystal films oppose each other on the PET films, a Butacite® polyvinyl butyral sheet layer, and a clear annealed float glass layer (6 inches by 12 inches by 2.5 mm thick). The glass/Butacite® polyvinyl butyral sheet/non-micellar liquid crystal film layer on PET film/Butacite® polyvinyl butyral sheet/non-micellar liquid crystal film layer on PET film/glass is then laminated according to the standard procedure, and the glass/Butacite® polyvinyl butyral sheet/non-micellar liquid crystal film layer on PET film/Butacite® polyvinyl butyral sheet/non-micellar liquid crystal film layer on PET film/glass multilayer laminate is removed from the autoclave.

Example 25

A glass laminate composed of a glass layer, a Butacite® polyvinyl butyral polymer sheet interlayer, a non-micellar liquid crystal film layer on PET film, a second Butacite® polyvinyl butyral polymer sheet interlayer, a second non-micellar liquid crystal film layer on PET film, a third Butacite® polyvinyl butyral polymer sheet interlayer and a glass layer is produced according to the process described for Example 24, where the non-micellar liquid crystal layer on PET film from PE18 is substituted for the non-micellar liquid crystal layer on PET film from PE15.

Example 26

A glass multilayer laminate composed of a glass layer, a Butacite® polyvinyl butyral polymer sheet interlayer, a non-micellar liquid crystal film layer on PET film, a second Butacite® polyvinyl butyral polymer sheet interlayer, a second non-micellar liquid crystal film layer on PET film, a third Butacite® polyvinyl butyral polymer sheet interlayer, a third non-micellar liquid crystal film layer on PET film, a fourth Butacite® polyvinyl butyral polymer sheet interlayer and a glass layer is produced in the following manner. The Butacite® polyvinyl butyral sheets (6 inches by 12 inches by 30 mils thick (0.030 inch)), and three non-micellar liquid crystal film layers on PET film from PE15, PE16, and PE18 (6 inches by 12 inches), are conditioned at 23 percent relative humidity (RH), at a temperature of 72 degrees F. overnight. The layers are arranged to provide a layer of glass, a Butacite® polyvinyl butyral sheet layer, the non-micellar liquid crystal layer on PET film from PE15, a Butacite® polyvinyl butyral sheet layer, the non-micellar liquid crystal layer on PET film from PE16 where the liquid crystal films oppose each other on the PET films, a Butacite® polyvinyl butyral sheet layer, the non-micellar liquid crystal layer on PET film from PE18 where the liquid PET films from PE16 and PE18 oppose each other, a Butacite® polyvinyl butyral sheet layer, and a clear annealed float glass layer (6 inches by 12 inches by 2.5 mm thick). The glass/Butacite® polyvinyl butyral sheet/non-micellar liquid crystal film layer on PET film/Butacite® polyvinyl butyral sheet/non-micellar liquid crystal film layer on PET film/Butacite® polyvinyl butyral sheet/non-micellar liquid crystal film layer on PET film/glass is then laminated according to the standard procedure, and the glass/Butacite® polyvinyl butyral sheet/non-micellar liquid crystal film layer on PET film/Butacite® polyvinyl butyral sheet/non-micellar liquid crystal film layer on PET film/Butacite® polyvinyl butyral sheet/non-micellar liquid crystal film layer on PET film/glass multilayer laminate is removed from the autoclave.

Examples 27 through 33

A glass multilayer laminate composed of a glass layer, a Butacite® polyvinyl butyral polymer sheet interlayer, an adhesively-bonded non-micellar liquid crystal PET film layer, a Butacite® polyvinyl butyral polymer sheet interlayer, and a glass layer is produced in substantially the same manner as Example 23 with the exception that the adhesively bonded non-micellar liquid crystal films from Preparative Examples PE24 through PE30 respectively are substituted for that of Preparative Example PE23.

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A multilayer laminate article for reflecting infrared radiation comprising:
   (a) at least one layer of a nonmicellar twisted nematic liquid crystal having cholesteric infrared-reflecting properties; and
   (b) at least one layer of a polymeric sheet comprising a polymer with a modulus of 20,000 psi (138 MPa) or less as measured by ASTM Method D-638, wherein at least one surface of at least one layer of the nonmicellar twisted nematic liquid crystal is in contact with at least one surface of at least one layer of the polymeric sheet; and
   (c) an adhesive or primer on at least one surface of at least one layer of the nonmicellar twisted nematic liquid crystal, wherein the adhesive or primer results in a shift in the wavelength of peak reflection of the nonmicellar twisted nematic liquid crystal of greater than 30 nm.

2. The multilayer laminate article of claim 1, wherein the polymeric sheet comprises polyvinyl butyral or poly(ethylene-co-vinyl acetate).

3. The multilayer laminate article of claim 1, further comprising at least one layer of a polymeric film.

4. The multilayer laminate article of claim 3, wherein the polymeric film is a biaxially oriented poly(ethylene terephthalate) film, a cellulose acetate film or a polycarbonate film.

5. The multilayer laminate article of claim 3, wherein at least one surface of at least one layer of the nonmicellar twisted nematic liquid crystal is in contact with at least one surface of at least one layer of the polymeric film.

6. The multilayer laminate article of claim 1, further comprising at least one layer of a rigid sheet comprising glass, polycarbonate, polyacrylate, a cyclic polyolefin, a cyclic polyolefin ethylene norbornene polymer, metallocene-catalyzed polystyrene or a combination thereof.

7. The multilayer laminate article of claim 6, wherein at least one surface of at least one layer of the nonmicellar twisted nematic liquid crystal is in contact with at least one surface of at least one layer of the rigid sheet.

8. The multilayer laminate article of claim 6, wherein the rigid sheet comprises glass.

9. The multilayer laminate article of claim 6, wherein there are two layers of polymeric sheet and two layers of rigid sheet.

10. The multilayer laminate article of claim 9, further comprising at least one layer of a polymeric film.

11. The multilayer laminate article of claim 1, wherein the adhesive or primer comprises gammaglycidoxypropyltrimethoxysilane or gamma-aminopropyltriethoxysilane.

12. The multilayer laminate article of claim 1, wherein the adhesive or primer comprises an epoxy resin, a siloxane resin, an acrylic or a polyallyl amine.

13. The multilayer laminate article of claim 1, wherein there are at least two layers of the nonmicellar twisted nematic liquid crystal having cholesteric infrared-reflecting properties, at least one of which is a layer of a nonmicellar right handed twisted nematic liquid crystal and at least one of which is a layer of a nonmicellar left handed twisted nematic liquid crystal.

14. The multilayer laminate article of claim 13, wherein there are equal numbers of nonmicellar right handed twisted nematic liquid crystal layers and nonmicellar left handed twisted nematic liquid crystal layers.

15. The multilayer laminate article of claim 14, wherein for each nonmicellar right handed twisted nematic liquid crystal layer exhibiting reflection of light at wavelength $\lambda_0$ there is a corresponding nonmicellar left handed twisted nematic liquid crystal exhibiting reflection of light at approximately the same wavelength.

16. The multilayer laminate article of claim 13, wherein the polymeric sheet comprises polyvinyl butyral or poly(ethylene-co-vinyl acetate).

17. The multilayer laminate article of claim 13, further comprising at least one layer of a polymeric film.

18. The multilayer laminate article of claim 17, wherein the polymeric film is a biaxially oriented poly(ethylene terephthalate) film, a cellulose acetate film or a polycarbonate film.

19. The multilayer laminate article of claim 18, further comprising at least one layer of a rigid sheet comprising glass, polycarbonate, polyacrylate, a cyclic polyolefin, a cyclic polyolefin ethylene norbornene polymer, metallocene-catalyzed polystyrene or a combination thereof.

20. The multilayer laminate article of claim 19, wherein the rigid sheet comprises glass.

21. The multilayer laminate article of claim 1, wherein the at least one layer of the nonmicellar twisted nematic liquid crystal has a reflective bandwidth of greater than 100 nm.

22. The multilayer laminate article of claim 21, wherein the polymeric sheet comprises polyvinyl butyral or poly(ethylene-co-vinyl acetate).

23. The multilayer laminate article of claim 21, further comprising at least one layer of a polymeric film.

24. The multilayer laminate article of claim 23, wherein the polymeric film is a biaxially oriented poly(ethylene terephthalate) film, a cellulose acetate film or a polycarbonate film.

25. The multilayer laminate article of claim 21, further comprising at least one layer of a rigid sheet comprising glass, polycarbonate, polyacrylate, a cyclic polyolefin, a cyclic polyolefin ethylene norbornene polymer, metallocene-catalyzed polystyrene or a combination thereof.

26. The multilayer laminate article of claim 25, wherein the rigid sheet comprises glass.

27. The multilayer laminate article of claim 1, further comprising n layers of half-wave plates, wherein n is an integer, wherein there are n pairs of layers of the nonmicellar twisted nematic liquid crystal, each layer of a pair having identical handedness and each layer of a pair exhibiting reflection of light around the same wavelength $\lambda_0$, and wherein a half-wave plate for the same wavelength $\lambda_0$ is positioned between each pair of layers of the nonmicellar twisted nematic liquid crystal having identical handedness.

28. The multilayer laminate article of claim 27, wherein the polymeric sheet comprises polyvinyl butyral or poly(ethylene-co-vinyl acetate).

29. The multilayer laminate article of claim 27, further comprising at least one layer of a polymeric film.

30. The multilayer laminate article of claim 29, wherein the polymeric film is a biaxially oriented poly(ethylene terephthalate) film, a cellulose acetate film or a polycarbonate film.

31. The multilayer laminate article of claim 27, further comprising at least one layer of a rigid sheet comprising glass, polycarbonate, polyacrylate, a cyclic polyolefin, a cyclic polyolefin ethylene norbornene polymer, metallocene-catalyzed polystyrene or a combination thereof.

32. The multilayer laminate article of claim 31, wherein the rigid sheet comprises glass.

33. The multilayer laminate article of claim 1, further comprising at least one infrared absorptive layer.

34. The multilayer laminate article of claim 33, wherein the polymeric sheet comprises polyvinyl butyral or poly(ethylene-co-vinyl acetate).

35. The multilayer laminate article of claim 33, further comprising at least one layer of a polymeric film.

36. The multilayer laminate article of claim 35, wherein the polymeric film is a biaxially oriented poly(ethylene terephthalate) film, a cellulose acetate film or a polycarbonate film.

37. The multilayer laminate article of claim 33, further comprising at least one layer of a rigid sheet comprising glass, polycarbonate, polyacrylate, a cyclic polyolefin, a cyclic polyolefin ethylene norbornene polymer, metallocene-catalyzed polystyrene or a combination thereof.

38. The multilayer laminate article of claim 37, wherein the rigid sheet comprises glass.

39. The multilayer laminate article of claim 33, wherein the infrared absorptive layer is a discrete film.

40. The multilayer laminate article of claim 33, wherein the infrared absorptive layer is a coating on one or more of the layers of the multilayer laminate article.

41. The multilayer laminate article of claim 33, wherein the infrared absorptive layer is incorporated into at least one or more of the layers of the multilayer laminate article.

42. The multilayer laminate article of claim 33, wherein the infrared absorptive layer comprises infrared absorptive inorganic nanoparticles.

43. The multilayer laminate article of claim 42, wherein the infrared absorptive inorganic nanoparticles are selected from the group consisting of antimony-doped tin oxide, tin-doped indium oxide, lanthanum hexaboride and mixtures thereof.

44. The multilayer laminate article of claim 1, further comprising infrared absorptive inorganic nanoparticles contained within at least one layer of the nonmicellar twisted nematic liquid crystal.

45. The multilayer laminate article of claim 1, further comprising infrared absorptive inorganic nanoparticles contained within at least one of the layers of the multilayer laminate article.

* * * * *